(12) United States Patent
Sandbrook

(10) Patent No.: US 12,243,424 B2
(45) Date of Patent: *Mar. 4, 2025

(54) VEHICLE FLOW MONITORING SYSTEM

(71) Applicant: Frogparking Limited, Palmerston North (NZ)

(72) Inventor: Donald H. Sandbrook, Palmerston North (NZ)

(73) Assignee: Frogparking Limited, Palmerston North (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,026

(22) Filed: Mar. 28, 2024

(65) Prior Publication Data

US 2024/0242608 A1    Jul. 18, 2024

Related U.S. Application Data

(63) Continuation of application No. 18/317,682, filed on May 15, 2023, now Pat. No. 11,948,458, which is a
(Continued)

(51) Int. Cl.
*G08G 1/14*     (2006.01)
*G01S 17/88*    (2006.01)

(52) U.S. Cl.
CPC .............. *G08G 1/141* (2013.01); *G01S 17/88* (2013.01)

(58) Field of Classification Search
CPC .......... G08G 1/141; G08G 1/143; G08G 1/04; G08G 1/142; G08G 1/146; G08G 1/14; G01S 17/88

See application file for complete search history.

(56) References Cited

U.S. PATENT DOCUMENTS 1,772,838 A * 8/1930 McEntire ............. G04B 18/003
                                                        968/115
4,128,218 A * 12/1978 Pohlig ..................... B61L 1/161
                                                        246/247
(Continued)

FOREIGN PATENT DOCUMENTS

EP       1772838 A1    4/2007
WO    2013114139 A1    8/2013

OTHER PUBLICATIONS https://web.archive.org/web/20191219040924/https:/parkingsense.com/our-technology/guidance-sensors-2/; Archive.org Internet Archive WaybackMachine Parking Sense Webpage; Dec. 19, 2019.
(Continued)

*Primary Examiner* — Hoi C Lau
(74) *Attorney, Agent, or Firm* — Neustel Law Offices

(57) ABSTRACT

A vehicle flow monitoring system for detecting both a car count and direction of movement of vehicles passing a point of interest. The vehicle flow monitoring system generally includes a car counter which may include a microcontroller and a pair of distance sensors. Each of the distance sensors is oriented toward a unique point of interest. Each of the distance sensors includes a threshold distance reading which is used to detect whether a vehicle has passed underneath the car counter. The system may determine direction of travel of the vehicle based on which of the distance sensors is passed by the vehicle first. The microcontroller may assign an Event ID to each time a vehicle passes each of the sensors, with the Event ID being used to identify when and if the vehicle should be counted, or whether a non-vehicle object has passed the car counter.

20 Claims, 19 Drawing Sheets

Related U.S. Application Data continuation of application No. 17/975,840, filed on Oct. 28, 2022, now Pat. No. 11,798,414, which is a continuation of application No. 17/502,895, filed on Oct. 15, 2021, now Pat. No. 11,488,475, which is a continuation of application No. 16/750,244, filed on Jan. 23, 2020, now Pat. No. 11,151,874.

(56) References Cited

U.S. PATENT DOCUMENTS

| | | | | |
|---|---|---|---|---|
| 5,574,426 | A * | 11/1996 | Shisgal | G01S 15/931 340/904 |
| 6,058,340 | A * | 5/2000 | Uchiyama | B60G 17/0165 280/5.514 |
| 6,345,228 | B1 * | 2/2002 | Lees | G08G 1/042 331/65 |
| 7,075,427 | B1 * | 7/2006 | Pace | B61L 23/06 246/126 |
| 7,312,722 | B2 | 12/2007 | Tillotson | |
| 8,108,055 | B2 * | 1/2012 | Wong | G08G 1/065 348/148 |
| 8,279,107 | B2 * | 10/2012 | Krstanovic | G08G 1/14 342/118 |
| 8,620,613 | B2 * | 12/2013 | Segawa | G07C 3/08 702/128 |
| 9,373,256 | B2 * | 6/2016 | Sandbrook | G08G 1/012 |
| 9,589,465 | B2 | 3/2017 | Sandbrook | |
| 9,671,526 | B2 * | 6/2017 | Kumar | H05B 47/175 |
| 9,704,400 | B1 | 7/2017 | Sandbrook | |
| 9,852,388 | B1 * | 12/2017 | Swieter | G06Q 10/06313 |
| 10,008,116 | B1 * | 6/2018 | Sandbrook | G08G 1/143 |
| 10,096,247 | B1 * | 10/2018 | Sandbrook | G08G 1/142 |
| 10,373,493 | B1 * | 8/2019 | Sandbrook | G08G 1/143 |
| 10,430,737 | B2 | 10/2019 | Yenni | |
| 10,510,250 | B2 * | 12/2019 | Sandbrook | G08G 1/144 |
| 10,748,424 | B2 * | 8/2020 | Sandbrook | G08G 1/142 |
| 11,151,874 | B2 * | 10/2021 | Sandbrook | G08G 1/0116 |
| 11,488,475 | B2 * | 11/2022 | Sandbrook | G01S 15/04 |
| 11,798,414 | B2 * | 10/2023 | Sandbrook | G08G 1/141 |
| 11,948,458 | B2 * | 4/2024 | Sandbrook | G01S 7/52004 |
| 2001/0052860 | A1 * | 12/2001 | McMaster | G08G 1/04 340/933 |
| 2002/0177942 | A1 * | 11/2002 | Knaian | G08G 1/02 340/907 |
| 2004/0239503 | A1 * | 12/2004 | Rider | G08B 13/2462 340/517 |
| 2006/0212344 | A1 * | 9/2006 | Marcus | G07B 15/02 705/13 |
| 2006/0235612 | A1 * | 10/2006 | Wilbrod | G08G 1/04 701/118 |
| 2006/0250278 | A1 * | 11/2006 | Tillotson | G08G 1/14 340/932.2 |
| 2009/0010490 | A1 * | 1/2009 | Wang | G06F 18/22 382/103 |
| 2009/0098903 | A1 * | 4/2009 | Donaldson | H04M 1/72403 455/552.1 |
| 2009/0119142 | A1 * | 5/2009 | Yenni | H04L 67/12 705/7.15 |
| 2011/0099126 | A1 * | 4/2011 | Belani | G08G 1/14 705/418 |
| 2011/0261650 | A1 * | 10/2011 | Olshansky | G01S 7/52004 367/99 |
| 2013/0106621 | A1 * | 5/2013 | Cecchet | G08G 1/146 340/932.2 |
| 2013/0148848 | A1 * | 6/2013 | Lee | G06V 20/52 382/103 |
| 2015/0185319 | A1 * | 7/2015 | Matsuura | G08G 1/167 73/627 |
| 2015/0339924 | A1 * | 11/2015 | Cook | G06V 20/52 382/104 |
| 2016/0007208 | A1 * | 1/2016 | Yang | H04W 4/02 455/422.1 |
| 2016/0042644 | A1 * | 2/2016 | Velusamy | G08G 1/096775 340/435 |
| 2016/0328961 | A1 * | 11/2016 | Garcés Cadenas | G08G 1/147 |
| 2016/0371619 | A1 * | 12/2016 | Foster | G06Q 10/0637 |
| 2017/0024619 | A1 * | 1/2017 | Wu | G06V 20/47 |
| 2017/0039852 | A1 * | 2/2017 | Nordbruch | G01S 17/88 |
| 2017/0106861 | A1 * | 4/2017 | Oh | B60W 30/16 |
| 2017/0135180 | A1 * | 5/2017 | Broers | H05B 47/115 |
| 2017/0178498 | A1 * | 6/2017 | Mcerlean | G08G 1/166 |
| 2017/0236417 | A1 * | 8/2017 | Carrara | G08G 1/147 340/932.2 |
| 2017/0364817 | A1 * | 12/2017 | Raykov | G06N 20/10 |
| 2018/0061081 | A1 * | 3/2018 | Nagao | G06V 20/53 |
| 2018/0061161 | A1 * | 3/2018 | Nagao | G06Q 10/04 |
| 2019/0071087 | A1 * | 3/2019 | Virgen | B60W 30/18018 |
| 2019/0077406 | A1 * | 3/2019 | Dudar | B60W 40/06 |
| 2019/0079181 | A1 * | 3/2019 | Mizuno | B60W 30/162 |
| 2019/0086545 | A1 * | 3/2019 | Mooney | G01S 17/06 |
| 2019/0367023 | A1 * | 12/2019 | Kobayashi | B60W 30/12 |
| 2020/0005319 | A1 * | 1/2020 | Scarborough | G06Q 10/087 |
| 2020/0111351 | A1 * | 4/2020 | Vadlamani | G08G 1/042 |
| 2020/0141176 | A1 * | 5/2020 | Ichinose | E05F 15/73 |
| 2020/0226928 | A1 * | 7/2020 | Hsu | H04W 4/40 |
| 2020/0256981 | A1 * | 8/2020 | Kuroki | G01S 13/931 |
| 2020/0298849 | A1 * | 9/2020 | Tanaka | B60W 40/04 |
| 2021/0055733 | A1 * | 2/2021 | Beller | G05D 1/0088 |
| 2021/0092572 | A1 * | 3/2021 | Nemec | H04W 4/40 |
| 2021/0163008 | A1 * | 6/2021 | Ghafouri | G06N 3/08 |
| 2021/0233403 | A1 * | 7/2021 | Sandbrook | G08G 1/0116 |
| 2022/0036733 | A1 * | 2/2022 | Sandbrook | G01S 15/88 |
| 2023/0046310 | A1 * | 2/2023 | Sandbrook | G01S 15/88 |
| 2023/0234526 | A1 * | 7/2023 | Kim | B60R 21/0132 |
| 2023/0290250 | A1 * | 9/2023 | Sandbrook | G08G 1/04 |
| 2024/0242608 | A1 * | 7/2024 | Sandbrook | G01S 15/08 |

OTHER PUBLICATIONS https://parkingsense.com/our-technology/guidance-sensors-2/; Parking Sense Guidance & Sensors Webpage; Apr. 2, 2020.

* cited by examiner

VEHICLE FLOW MONITORING SYSTEM

CROSS REFERENCE TO RELATED APPLICATIONS

The present application is a continuation of U.S. application Ser. No. 18/317,682 filed on May 15, 2023, which is a continuation of U.S. application Ser. No. 17/975,840 filed on Oct. 28, 2022 now issued as U.S. Pat. No. 11,798,414, which is a continuation of U.S. application Ser. No. 17/502,895 filed on Oct. 15, 2021 now issued as U.S. Pat. No. 11,488,475, which is a continuation of U.S. application Ser. No. 16/750,244 filed on Jan. 23, 2020 now issued as U.S. Pat. No. 11,151,874. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a vehicle flow monitoring system for detecting both a car count and direction of movement of vehicles passing a point of interest.

Related Art

Any discussion of the related art throughout the specification should in no way be considered as an admission that such related art is widely known or forms part of common general knowledge in the field.

Detecting and counting a vehicle as it passes a point for the purposes of determining parking lot usage, statistics or analysis has been around for some time, with traditional means of detection including 'road tubes', infra-red, magnetometer, image processing and inductive loops.

'Road tubes' are tubes installed on the road surface that trigger a change in pressure when an axle travels over the tube, which is then detected and counted. However, it only detects axles and therefore is difficult to distinguish between tail gating vehicles and trucks and similar such circumstances.

Inductive loops are impractical to install and are unreliable. They are often used for entry and exit points on parking lots and due to their unreliability, quickly lead to cumulative errors. Also, to determine the direction of a vehicle, two loops are required—doubling the impractical issues of installation.

Image processing is complicated and therefore prone to errors. Although the image sensor does not require mounting on the road surface, increasing the reliability, it is highly susceptible to difficult to control environmental conditions such as lighting.

Magnetometer based vehicle detection sensors typically measure disruptions in the earth's magnetic field caused by the presence of a vehicle. This disruption is small and unpredictable, as well as being temperature dependent—for these reasons, magnetometer based sensors have never achieved a high level of detection accuracy. These are also typically mounted on the road surface, which creates reliability issues due to the harsh environment.

Infra-red sensors rely heavily upon a clear or translucent window through an enclosure. This enclosure window is easily prone to damage rendering the sensor useless. When the window is blocked, either deliberately by misguided youths for example, or through environmental effects such as snow, the detection does not work. Furthermore, infrared sensors typically only have a binary output of present or not, limiting their practical use in algorithms.

SUMMARY

An example embodiment is directed to a vehicle flow monitoring system. The vehicle flow monitoring system includes a car counter which may include a microcontroller and a pair of distance sensors. Each of the distance sensors is oriented toward a unique point of interest. Each of the distance sensors includes a threshold distance reading which is used to detect whether a vehicle has passed underneath the car counter. The system may determine direction of travel of the vehicle based on which of the distance sensors is passed by the vehicle first. The microcontroller may assign an Event ID to each time a vehicle passes each of the sensors, with the Event ID being used to identify when and if the vehicle should be counted, or whether a non-vehicle object has passed the car counter.

There has thus been outlined, rather broadly, some of the embodiments of the vehicle flow monitoring system in order that the detailed description thereof may be better understood, and in order that the present contribution to the art may be better appreciated.

There are additional embodiments of the vehicle flow monitoring system that will be described hereinafter and that will form the subject matter of the claims appended hereto. In this respect, before explaining at least one embodiment of the vehicle flow monitoring system in detail, it is to be understood that the vehicle flow monitoring system is not limited in its application to the details of construction or to the arrangements of the components set forth in the following description or illustrated in the drawings. The vehicle flow monitoring system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1A:
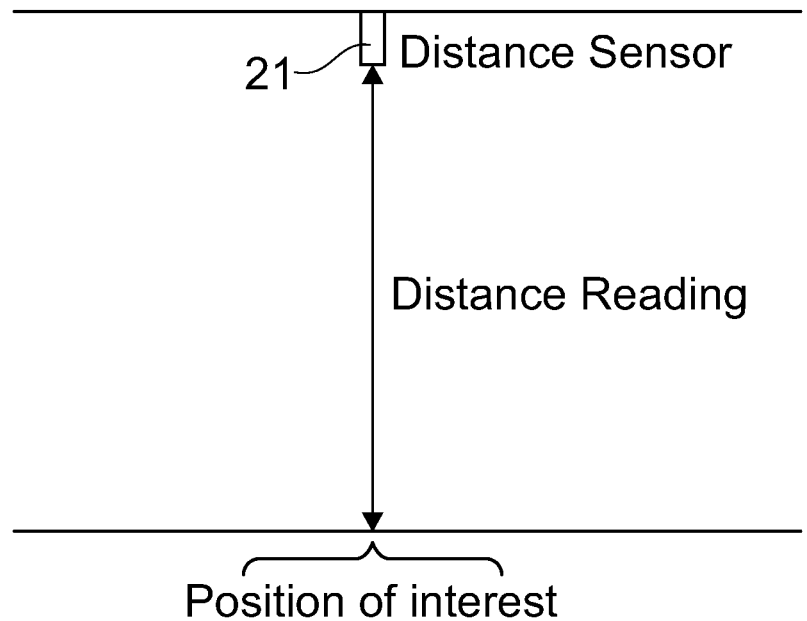
FIG. 1A is a side view of a vehicle flow monitoring system having one unobstructed distance sensor in accordance with an example embodiment.

An example vehicle flow monitoring system generally comprises a car counter 20 which is adapted to detect passage of a vehicle 12, wherein the car counter 20 comprises a first distance sensor 21 and a second distance sensor 22. The first distance sensor 21 may be oriented towards a first point of interest and the second distance sensor 22 may be oriented towards a second point of interest. The first distance sensor 21 is adapted to detect each of the vehicles 12 passing the first distance sensor 21. The second distance sensor 22 is adapted to detect each of the vehicles passing the second distance sensor 22. The first point of interest is distally-spaced with respect to the second point of interest.

A microcontroller 24 is communicatively interconnected with the car counter 20, wherein the microcontroller 24 is communicatively interconnected with a database 31, wherein the database includes a first threshold value for the first distance sensor 21 and a second threshold value for the second distance sensor 22, wherein the microcontroller 24 is adapted to detect when a first distance reading detected by the first distance sensor 21 s greater than or less than the first threshold value, wherein the microcontroller is adapted to detect when a second distance reading detected by the second distance sensor 22 is greater or less than the second threshold value; wherein the microcontroller 24 is adapted to count each vehicle 12 passing the car counter 20.

The microcontroller 24 may be adapted to detect direction of movement of the vehicle 12 based on which of the first distance sensor 21 or the second distance sensor 22 is passed by the vehicle 12 first. The first distance sensor 21 and the second distance sensor 22 may each be comprised of a LIDAR sensor. The first threshold value may be configured to be beyond a noise level of an unobstructed distance reading of the first distance sensor 21. The second threshold value may be configured to be beyond a noise level of an unobstructed distance reading of the second distance sensor 22.

The car counter 20 may be positioned above the first and second points of interest. The distance between the points of interest may be shorter than a length of the vehicle 12. The first distance sensor 21 may be distally-spaced with respect to the second distance sensor 22, wherein both the first distance sensor 21 and the second distance sensor 22 are vertically-oriented. Alternatively, the first distance sensor 21 may be adjacent to the second distance sensor 22, wherein both the first distance sensor 21 and the second distances sensor 22 are both diagonally-oriented towards their respective points of interest.

The first and second distance sensors 21, 22 may be adapted to take distance measurements at the same time. The first threshold value of the first distance sensor 21 may be calibrated based on noise readings from the first distance sensor 21 and the second threshold value of the second distance sensor 22 may be calibrated based on noise readings from the second distance sensor 22.

The microcontroller 24 may be directly connected to both of the distance sensors 21, 22. The microcontroller 24 may be adapted to classify transitions from unobstructed measurements to obstructed measurements by each of the first distance sensor 21 and the second distance sensor 22 as an event. The microcontroller 24 may be adapted to assign an Event ID to each of the events detected by the distance sensors 21, 22. The microcontroller 24 may be adapted to recognize when a non-vehicle object has passed the first distance sensor 21 or the second distance sensor 22 such that the non-vehicle object is not counted. The microcontroller 24 may also be adapted to identify when the vehicle has a trailer based on a sequence of Event ID's. The microcontroller 24 may be adapted to reset the distance sensors 21, 22 after a period of time has passed.

In an example embodiment, the car counter 20 may comprise a third distance sensor 28 and a fourth distance sensor 29, wherein the first and second distance sensors 21, 22 monitor a first lane of traffic and wherein the third and fourth distance sensors 28, 29 monitor a second lane of traffic.

B. Car Counters

As shown throughout the figures, the vehicle flow monitoring system 10 may include car counters 20 for monitoring the flow of vehicles past a desired location. By way of example, the desired location could be an entrance or exit to a parking garage, which will allow monitoring of the number of available parking spaces. As another non-limiting example, the desired location could be a roadway on which it is desired to analyze traffic patterns, such as is typical when analyzing whether a roadway needs to be improved to accommodate different traffic patterns.

The figures illustrate a number of exemplary embodiments of car counters 20 for use with the vehicle flow monitoring system 10. It should be appreciated that the illustration and description of such exemplary embodiments is for exemplary purposes only, and thus should not be construed as limiting in scope. For example, the number, positioning, and orientation of any distance sensors 21, 22, 27, 28 may vary in different embodiments.

Figure 1B:
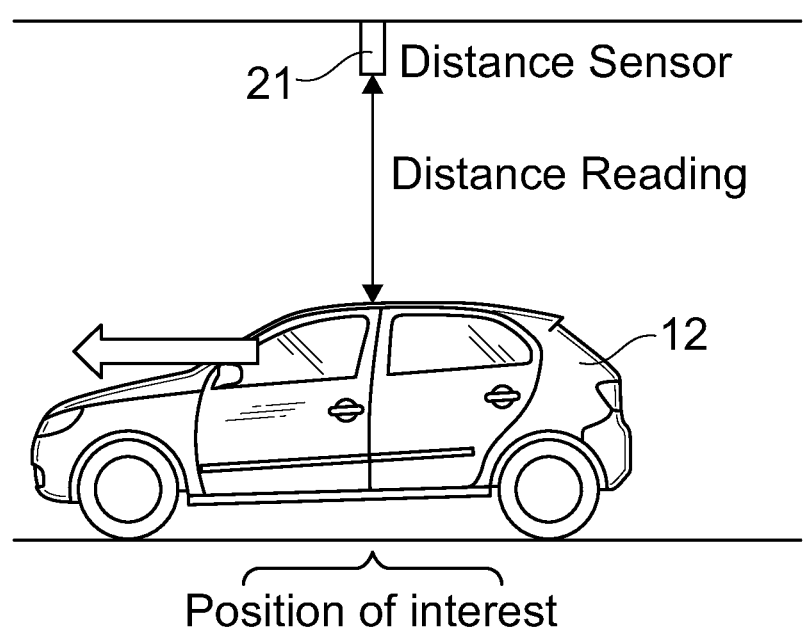
FIG. 1B is a side view of a vehicle flow monitoring system having a vehicle passing underneath a distance sensor in accordance with an example embodiment.
Figure 2:
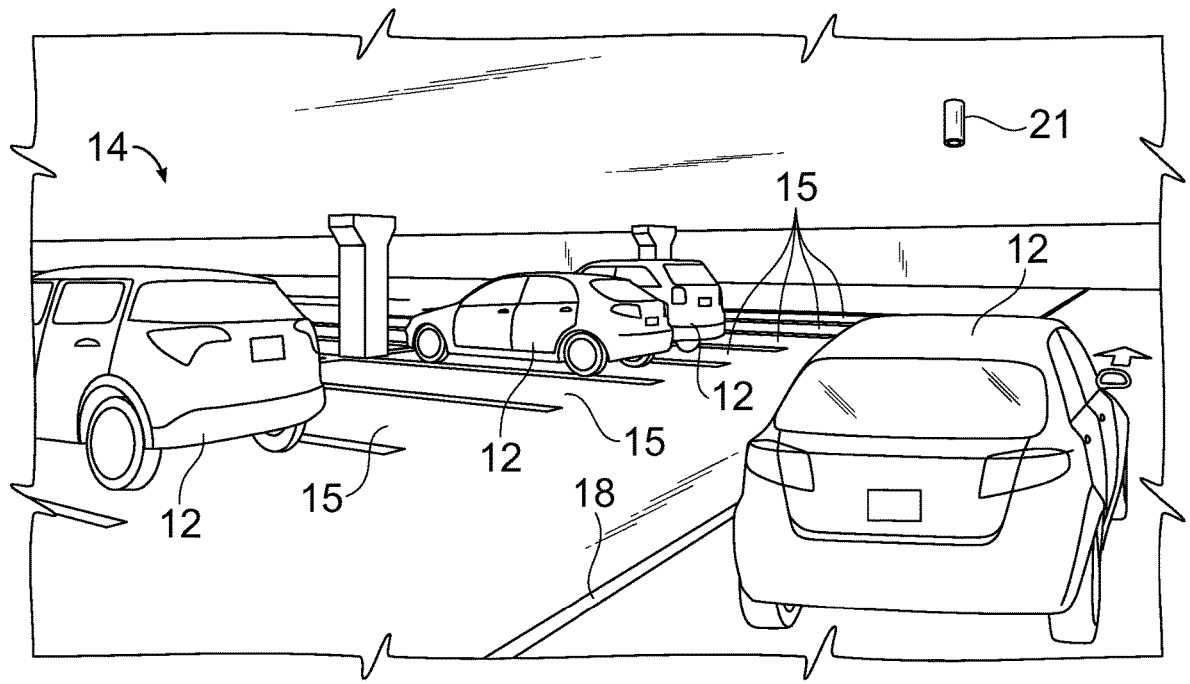
FIG. 2 is a perspective view of a vehicle flow monitoring system in accordance with an example embodiment.

In the exemplary embodiment shown in FIGS. 1A, 1B, and 2, only a first distance sensor 21 is utilized. As shown in FIG. 1A, the first distance sensor 21 may be positioned above the point of interest to be monitored for vehicle flow. For example, in a parking garage, the distance sensor 21 may be secured to the ceiling of the parking garage. As another example, on an uncovered roadway, the distance sensor 21 could be suspended or otherwise secured above the roadway, such as by a support such as a pole as is commonly used for lighting on roadways. As yet another example, the distance sensor 21 could be secured to the same framework as traffic lights.

As shown in FIG. 1A, the distance sensor 21 continuously takes a distance reading between the distance sensor 21 and a point underneath the distance sensor 21. When no vehicle 12 is underneath the distance sensor 21, the distance sensor 21 will detect the distance to the roadway such as shown in FIG. 1A.

When a vehicle 12 is underneath the distance sensor 21, the distance sensor 21 will detect the distance to the vehicle such as shown in FIG. 1B. In this manner, the distance sensor 21 can determine whether a vehicle 12 is passing underneath the distance sensor 21, as the distance between the distance sensor 21 and the roadway will be greater than the distance between the distance sensor 21 and the vehicle 12 when the vehicle is passing underneath.

FIG. 2 illustrates usage of a car counter 20 comprised of a single distance sensor 21 in use in a parking garage 14. As can be seen, a single distance sensor 21 has been positioned over a lane of the parking garage 14. The positioning of the distance sensor 21 may vary in different embodiments. For example, the distance sensor 21 could be positioned on an entry lane of the parking garage 14 so as to count the number of vehicles 12 entering the parking garage 14. A separate distance sensor 21 could be positioned on an exit lane of the parking garage 14 so as to count the number of vehicles 12 exiting the parking garage 14. In this manner, the number of vehicles 12 within the parking garage 14 can be monitored.

As the vehicle 12 is moving within the lane being monitored by the car counter 20, the timing of the distance sensor 21 will dictate if the sensor 21 detects a "hit" on a vehicle 12 passing underneath the sensor 21. Therefore, the sampling rate of the distance sensor 21 will affect readings. For example, the more frequently readings are taken, the more likely a vehicle 12 passing underneath the distance sensor 21 will result in a shorter distance detected by the distance sensor 21.

By way of example and without limitation, an exemplary embodiment may utilize distance samples taken at 50 times per second (50 Hertz). However, the sampling rate for distance measurements could vary within any range capable of being processed by a requisite processing device, such as a microcontroller 24 as discussed herein. The sampling rate of the distance sensor 21 could be adjusted to suit various implementations. For example, in areas with slower traffic (such as within a parking garage), a sampling rate of 20 Hz may be suitable. In areas with faster traffic (such as over a roadway), a sampling rate of 100 Hz may be more desirable to ensure accurate readings.

FIGS. 1A, 1B, and 2 illustrate an exemplary position of the first distance sensor 21 over the point of interest. However, it should be appreciated that the positioning of the first distance sensor 21 may vary in different embodiments. The systems and methods described herein are flexible with respect to the mounting position of the distance sensor 21, and any configuration can be supported so long as a vehicle 12 in the path of the distance sensor 21 yields a different reading than when a vehicle 12 is not present. By way of example and without limitation, in some embodiments the distance sensor 21 may be positioned horizontally across the path of the vehicle 12, vertically underneath the vehicle such as on the road surface, or any angle therebetween.

While use of a car counter 20 comprising a single distance sensor 21 provides some car counting functionality, it should be understood that a single distance sensor 21 is not operable to determine the direction of travel of the vehicle 12. In situations in which direction of movement is to be detected, it would be beneficial to add a second distance sensor 22 such that readings from both distance sensors 21, 22 may be utilized to determine the direction of travel of the vehicle 12.

For example, it may be desirable to only count vehicle's 12 going in a certain direction. With the use of a second distance sensor 22 as discussed below, vehicles 12 travelling in an opposite direction can be excluded from the count. The use of a second distance sensor 22 may also reduce errors introduced from random events such as pedestrians passing by the distance sensor 21 in one-sensor embodiments.

Figure 3A:
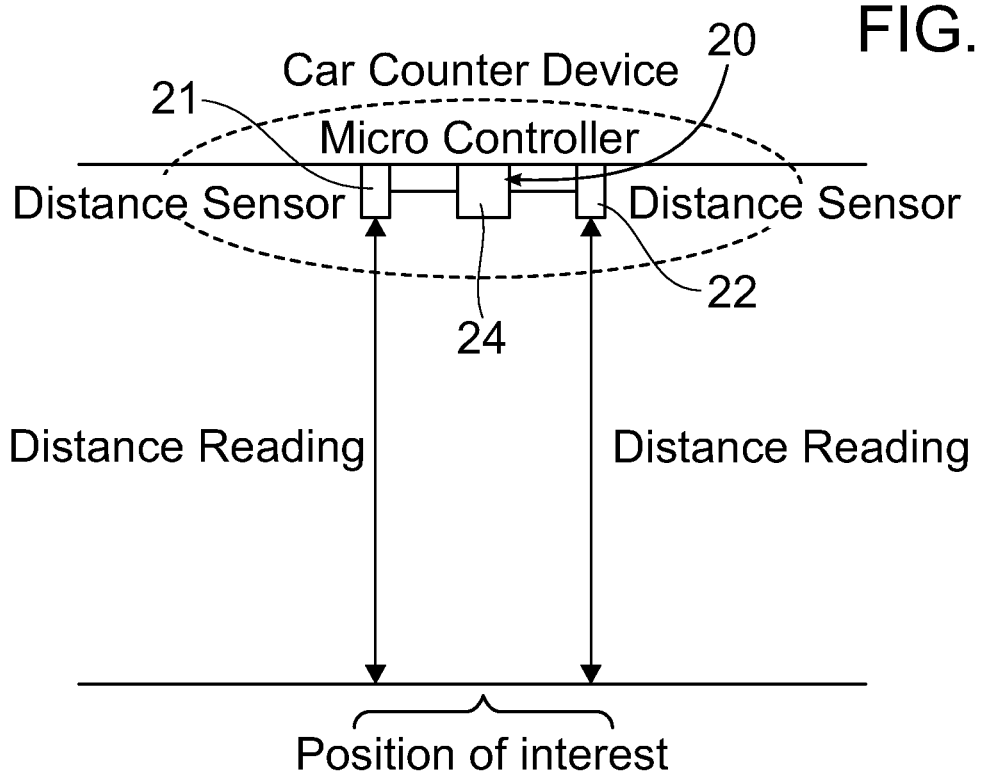
FIG. 3A is a side view of a vehicle flow monitoring system having two unobstructed distances sensors in accordance with an example embodiment.
Figure 3B:
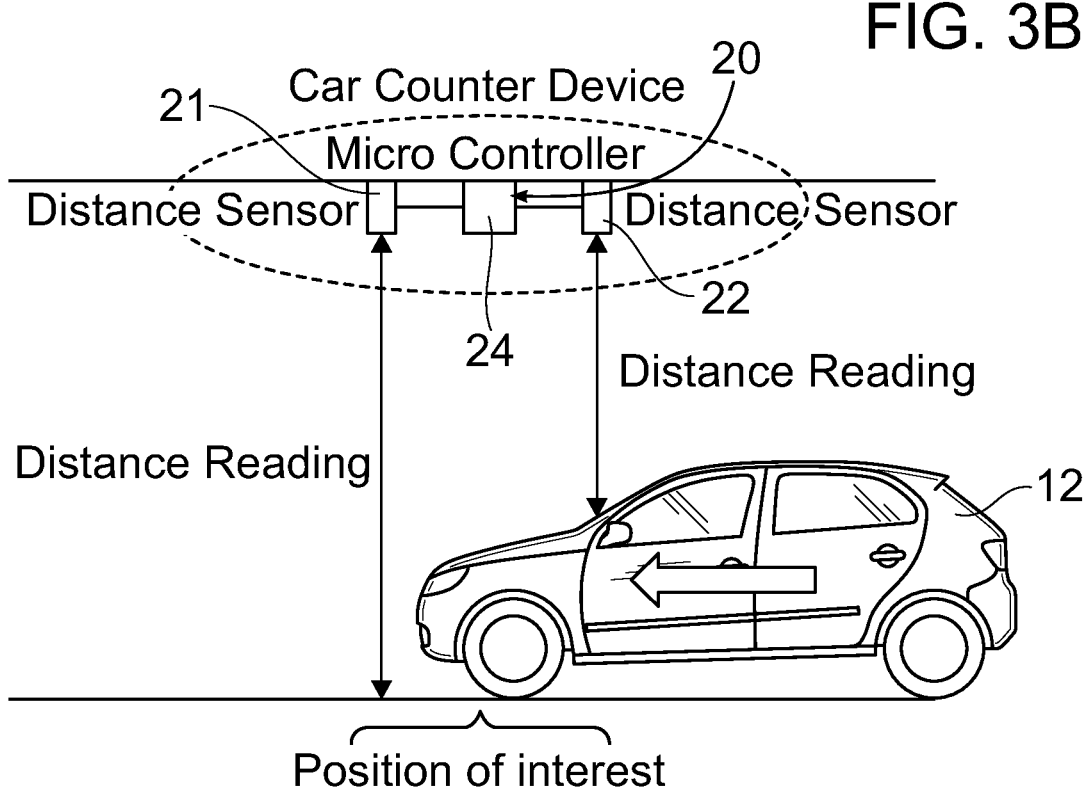
FIG. 3B is a side view of a vehicle flow monitoring system having a vehicle passing underneath a pair of distance sensors in accordance with an example embodiment.
Figure 4:
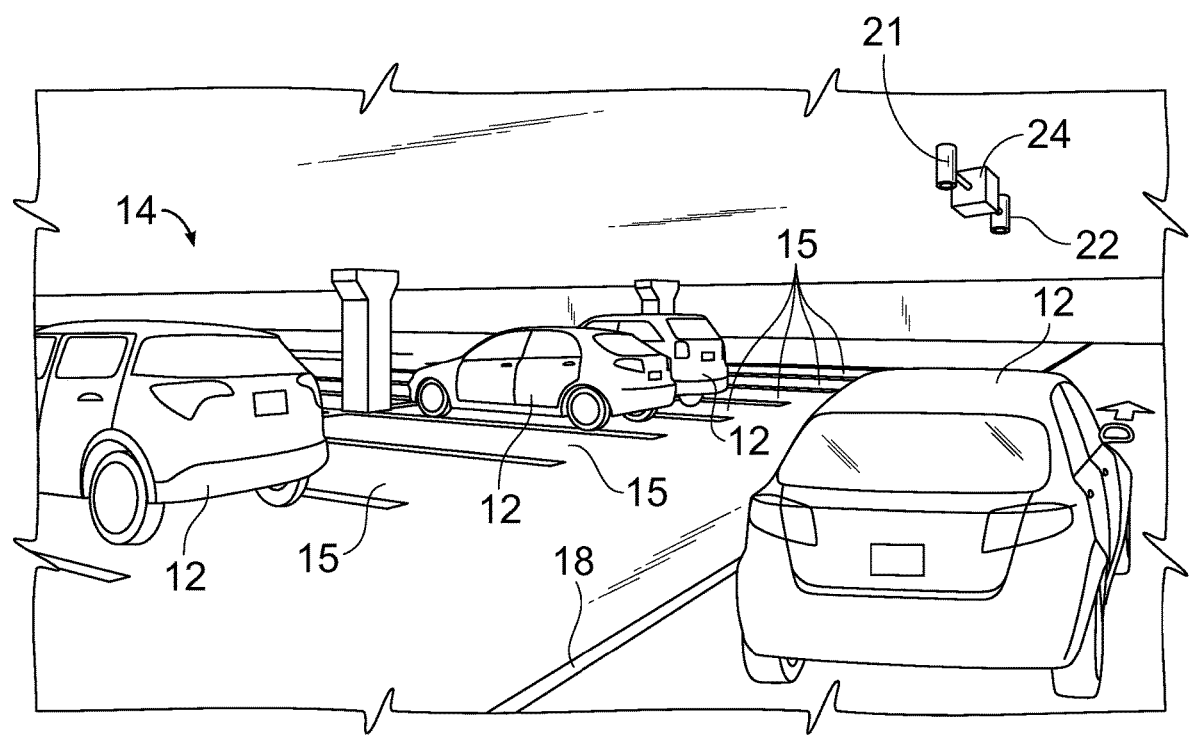
FIG. 4 is a perspective view of a vehicle flow monitoring system in accordance with an example embodiment.

FIGS. 3A, 3B, and 4 illustrate a first exemplary embodiment of a car counter 20 utilizing a pair of distance sensors 21, 22. In such an exemplary embodiment, it can be seen that a microcontroller 24 may be positioned between the distance sensors 21. It should be appreciated that the use of a hard-wired microcontroller 24 is optional. For example, in some embodiments, the distance sensors 21, 22 may be wirelessly connected to the microcontroller 24, such as through a communications protocol such as Bluetooth. In such wireless embodiments, the microcontroller 24 may be positioned remotely with respect to the distance sensors 21, 22. For example, in the case of a parking garage, a single microcontroller 24 could be positioned in a housing and adapted to remotely communicate with any sensors 21, 22 in the parking garage.

The exemplary embodiment of FIGS. 3A, 3B, and 4 illustrates a microcontroller 24 which is positioned on the overheard ceiling of a parking garage adjacent to the pair of distance sensors 21, 22. While the figure illustrates that the microcontroller 24 is centrally-located between the distance sensors 21, 22, it should be appreciated that such positioning of the microcontroller 24 is merely for illustrative purposes, as the microcontroller 24 may be positioned at various locations with respect to the distance sensors 21, 22 including, in some embodiments, remotely.

By use of two sensors 21, 22 such as shown in FIGS. 3A, 3B, and 4, the direction of travel of the vehicle 12 may be determined by the car counter 20. With this type of arrangement, the first distance sensor 21 may detect a shorter distance than the second distance sensor 22 as the car passes underneath. This enables the detection of the direction of the vehicle.

As a vehicle 12 passes underneath the car counter 20, it is desirable that neither of the distance sensors 21, 22 read the maximum distance reading to the point of interest such as the road surface while a vehicle 12 is passing the point of interest. In this manner, false positives can be avoided. Thus, the spacing of the distance sensors 21, 22 with respect to each other should be limited to less than the expected length of the longest vehicle 12 expected to pass under the car counter 20.

This distance may vary depending on the location of the car counter 20. For example, in a parking garage with limited clearance, it is extremely unlikely that a large semi-truck would be passing under the car counter 20. In such an embodiment, the distance between the distance sensors 21, 22 may be minimized since a longer vehicle 12 is not expected. By contrast, a car counter 20 positioned over a freeway will necessarily need to have the distance sensors 21, 22 spaced appropriately for longer vehicles such as semi-trucks.

The pair of distance sensors 21, 22 may be centrally-located above the point of interest such as shown in the figures, with each of the distance sensors 21, 22 being equidistance from the point of interest. For example, if the first distance sensor 21 is two meters away from the point of interest in a first horizontal direction, the second distance sensor 22 may be two meters from the point of interest in a second horizontal direction. These sample distances are merely exemplary and should not be construed as limiting in scope, as the spacing between the distance sensors 21, 22 will be determined based on the expected length of the vehicles 12 being monitored.

The sampling of distance readings from the distance sensors 21, 22 also need to be timed properly to ensure accurate readings. In a preferred embodiment, each of the pair of distance sensors 21, 22 samples distance readings within the same time window, such as at the same point in time. However, due to constraints in processing power, available sensors 21, 22, and communications protocols, the measurements taken by each of the distance sensors 21, 22 may be slightly separated in time. However, the readings will still be accurate so long as the readings are as far apart in time as the time it would take for the vehicle 12 to travel the distance from the first distance sensor 21 to the second distance sensor 22.

The manner in which the two-sensor car counter 20 operates to both count cars and determine direction of travel may vary in different embodiments. In a simplified methodology, a vehicle 12 will be counted each time that both distance sensors 21, 22 detect a distance less than that to the point of interest (the road surface). When both distance sensors 21, 22 revert to detecting the distance to the point of interest, the car count for that vehicle 12 will be completed and the system will be reset awaiting another vehicle 12. If only a single distance sensor 21 is triggered at a time, it can be often assumed that it was not a vehicle 12 that passed underneath the distance sensors 21, 22. If both distance sensors 21, 22 are triggered, it can be assumed that a vehicle 12 passed underneath the distance sensor 21, 22.

The first distance sensor 21, 22 to trigger will indicate the direction of travel of the vehicle 12. For example, if the first distance sensor 21, 22 triggers first, the vehicle 12 is moving in the direction of the first distance sensor 21. If the second distance sensor 21, 22 triggers first, the vehicle 12 is moving in the direction of the second distance sensor 22. In this manner, the direction of movement of the vehicle 12 may be determined through the usage of the two distance sensors 21, 22.

Figure 5A:
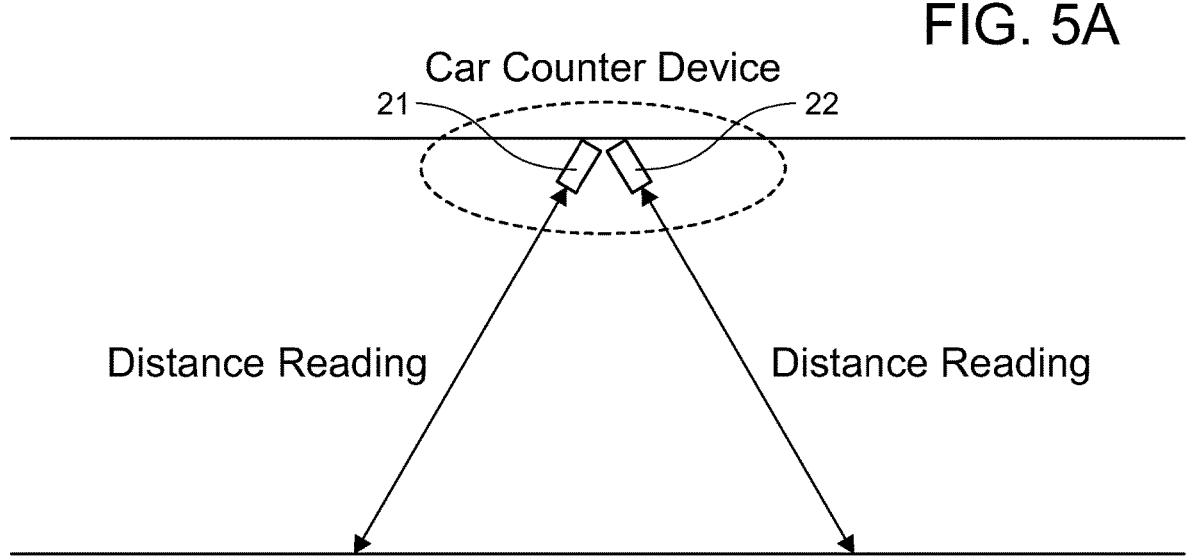
FIG. 5A is a side view of a vehicle flow monitoring system having a pair of diagonally-oriented distance sensors in accordance with an example embodiment.
Figure 5B:
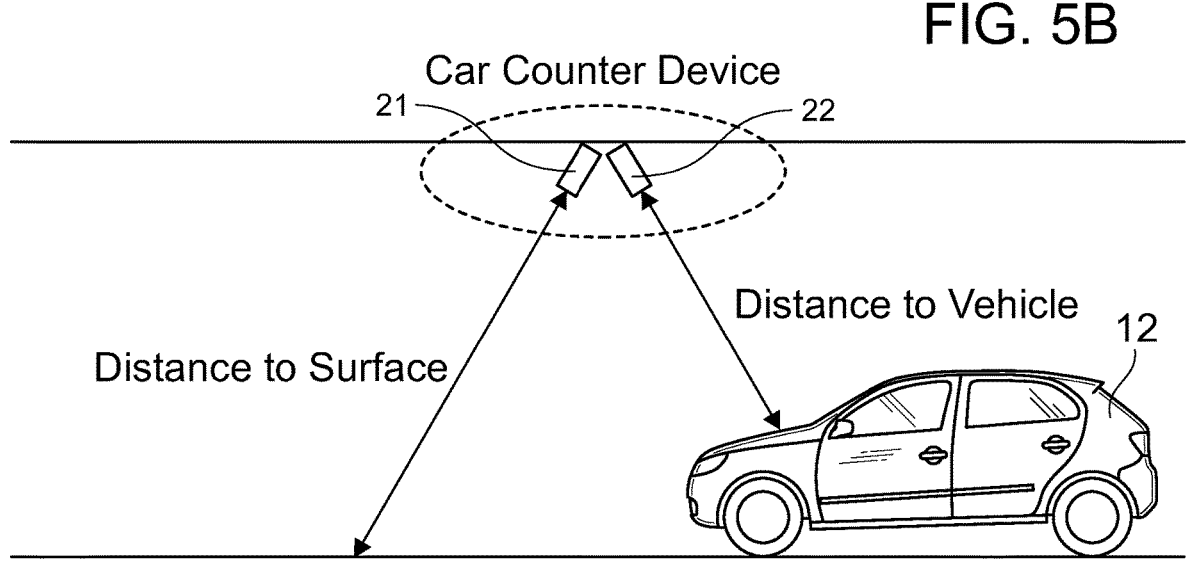
FIG. 5B is a side view of a vehicle passing underneath a pair of diagonally-oriented distance sensors of a vehicle flow monitoring system in accordance with an example embodiment.
Figure 6:
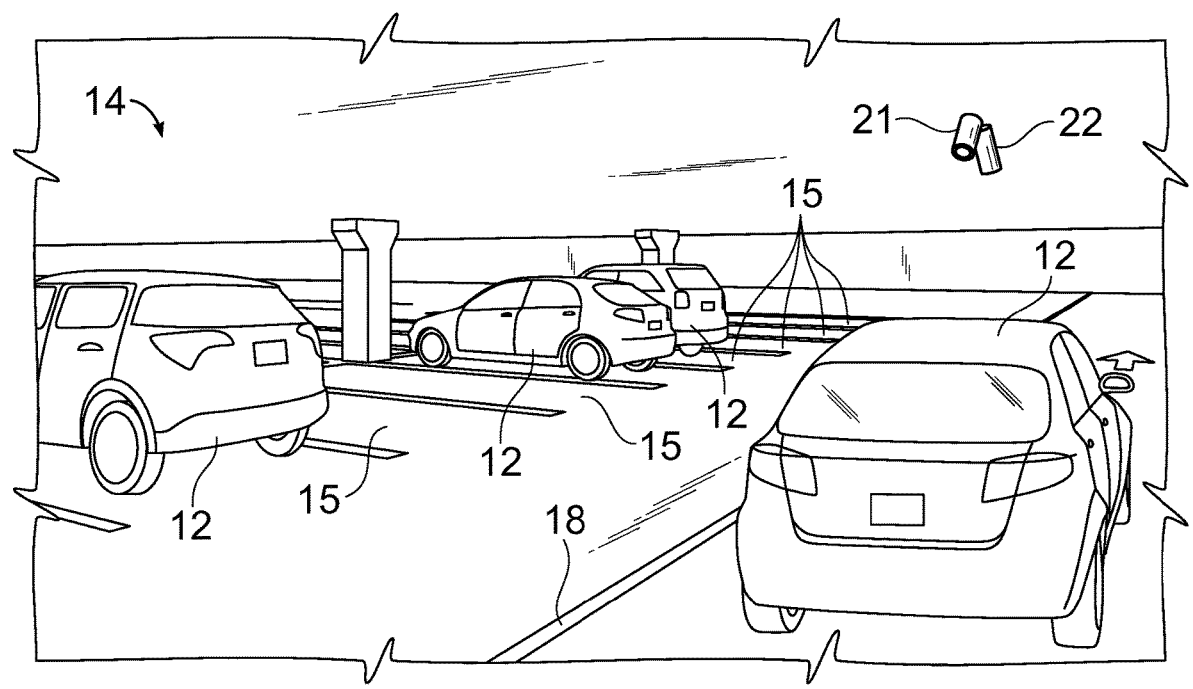
FIG. 6 is a perspective view of a vehicle flow monitoring system in accordance with an example embodiment.

In the exemplary embodiment shown in FIGS. 1-4, it can be seen that each illustrated distance sensor 21, 22 is oriented vertically to point down toward the road surface, forming a right angle with the ceiling or other surface to which the distance sensor 21, 22 is secured. In an alternate embodiment as shown in FIGS. 5A, 5B, and 6, it can be seen that the distance sensors 21, 22 are instead angularly-oriented in a diagonal orientation. Such an embodiment may be utilized to save space as the two distance sensors 21, 22 may be positioned directly adjacent to each other. In such an embodiment, the microcontroller 24 may be positioned above the distance sensors 24 with a wired connection or remotely with a wireless connection.

Figure 7:
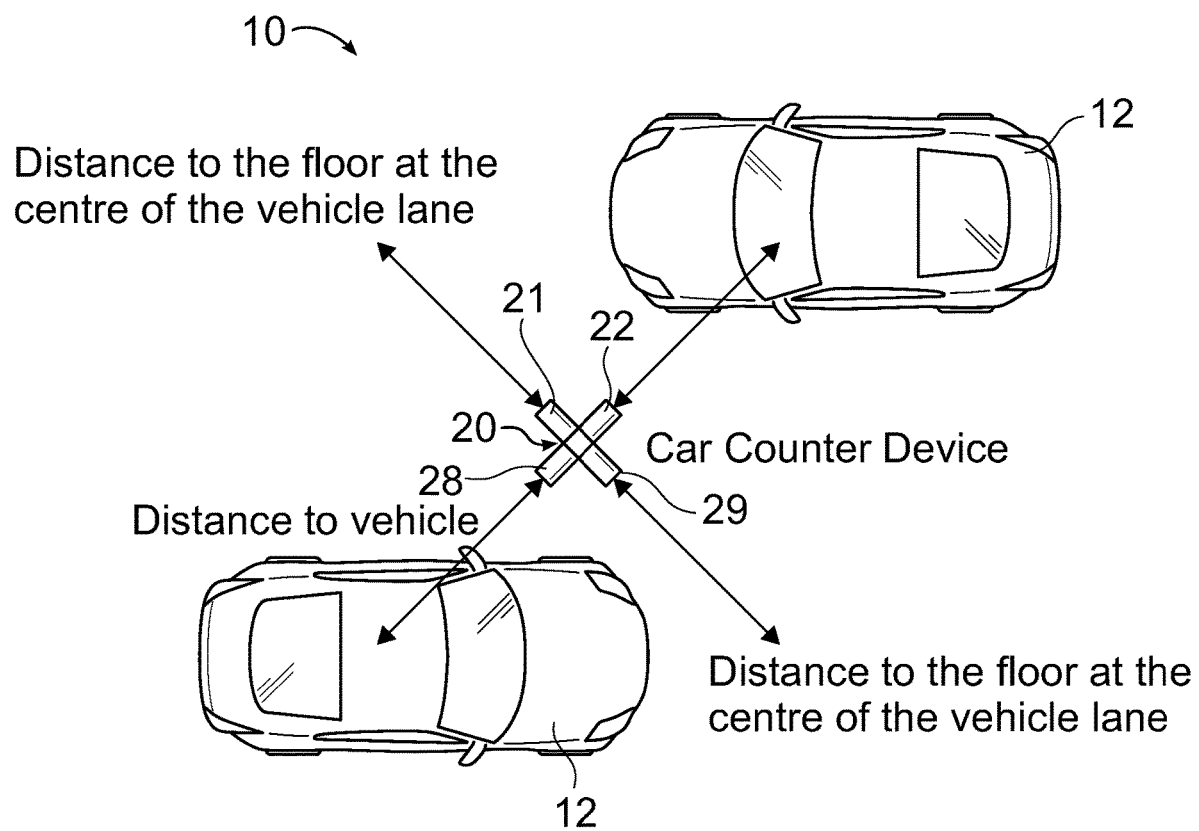
FIG. 7 is a top view of a vehicle flow monitoring system in use to monitor two lanes of traffic in accordance with an example embodiment.
Figure 8:
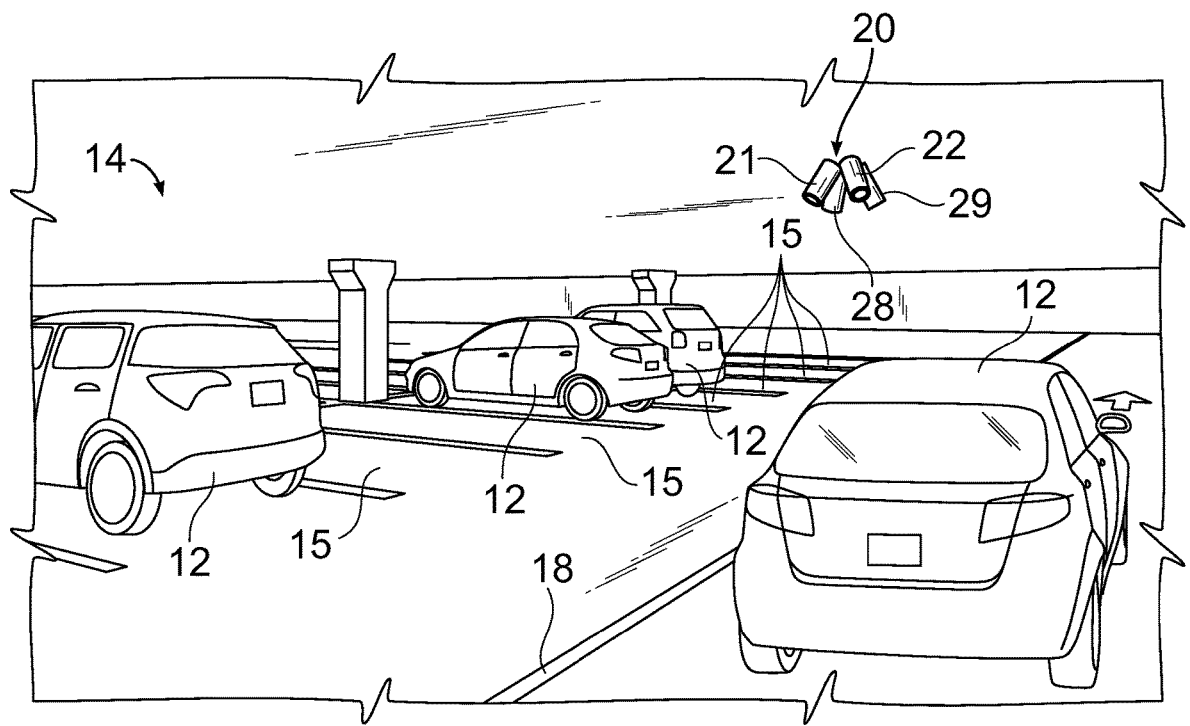
FIG. 8 is a perspective view of a vehicle flow monitoring system in accordance with an example embodiment.

FIGS. 7 and 8 illustrate an embodiment of a car counter 20 in which four distance sensors 21, 22, 28, 29 are utilized. In such an embodiment, a first pair of distance sensors 21, 22 comprised of a first distance sensor 21 and a second distance sensor 22 may be positioned over a first lane on the first side of a lane divider 18 and a second pair of distance sensors 28, 29 comprised of a third distance sensor 28 and a fourth distance sensor 29 may be positioned over a second lane on the second side of a lane divider 18.

In this manner, two adjacent lanes of traffic may be simultaneously monitored, with the first lane of traffic being monitored by the first pair of distance sensors 21, 22 and the second lane of traffic being monitored by the second pair of distance sensors 28, 29. The distance sensors 21, 22, 28, 29 may be positioned adjacent to each other and oriented diagonally such as shown in the figures to form an X-pattern. In other embodiments, a microcontroller 24 may be centrally-located with each other the distance sensors 21, 22, 28, 29 being connected to the microcontroller 24. The distance sensors 21, 22, 28, 29 may also be vertically-oriented in such an embodiment though not shown in the figures.

In some embodiments, it may be possible to detect direction of travel with use of a single distance sensor 21, provided that the single distance sensor 21 could be positioned to take readings where desired. In other words, the distance sensor 21 may be movable along a surface, such as through the use of rails, tracks, or the like. So long as the distance sensor 21 is configured to move at an appropriate speed, it could perform the function of a pair of sensors 21, 22 by moving with the vehicle 12. It should also be appreciated that, in situations with long vehicles being expected, additional sensors 21, 22, 28, 29 could be utilized for each lane. For example, rather than the use of two sensors 21, 22 per lane, an embodiment with longer vehicles expected could use three, four, five, or more sensors 21, 22, 28, 29 per lane.

It should be appreciated that a wide range of different types of distance sensors 21, 22, 28, 29 may be utilized in different embodiments. By way of example and without limitation, the distance sensors 21, 22, 28, 29 could rely on a wide range of signals, including but not limited to laser, infrared LED, sonic waves, and the like. As such, it should be appreciated that both light-based (visual) and sound-based (sonic) sensors may be utilized for different embodiments.

Figure 9:
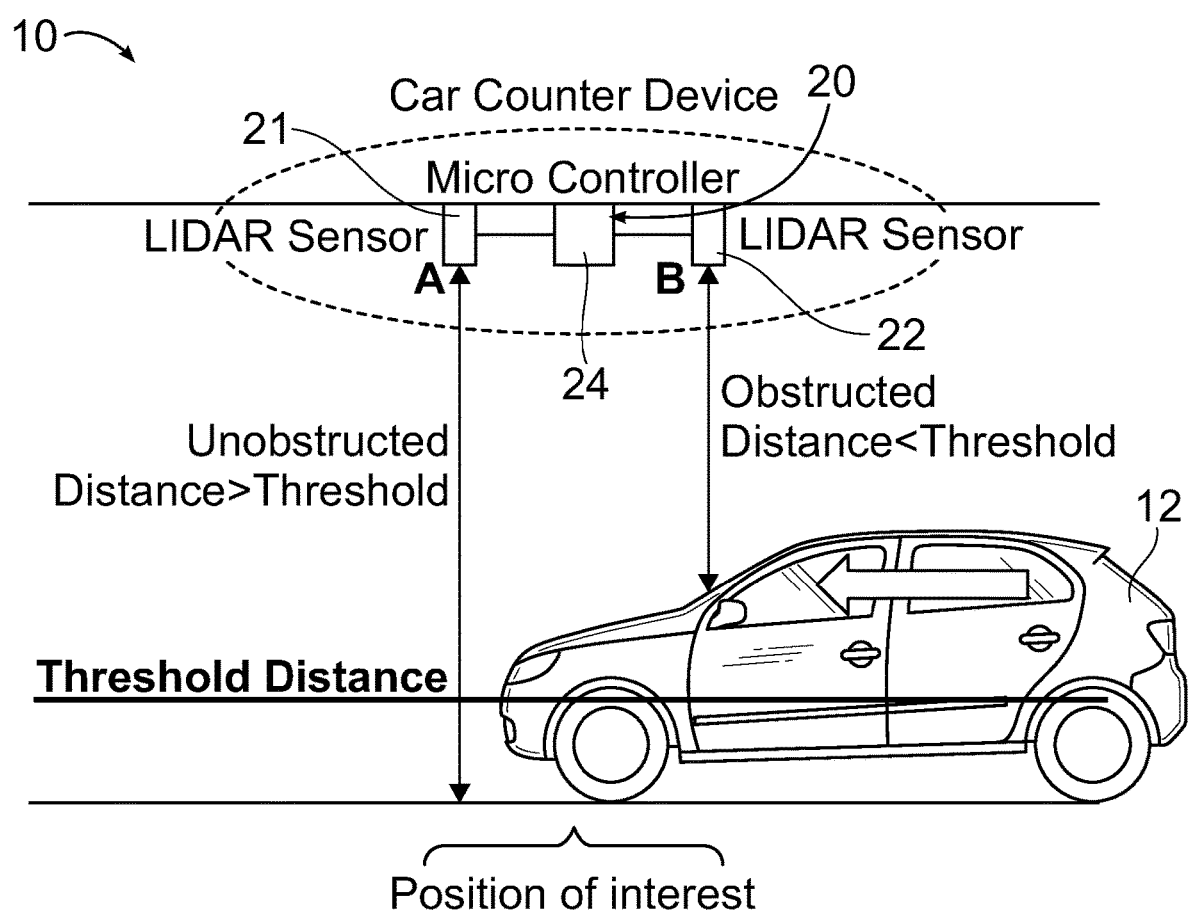
FIG. 9 is a side view of a vehicle flow monitoring system in use in accordance with an example embodiment.

In a preferred embodiment as shown in FIG. 9, the preferred distance sensor 21, 22, 28, 29 used for providing distance readings in the car counter 20 is a LIDAR (light detection and ranging) sensor. A LIDAR sensor is typically an integrated instrument that fires rapid pulses of laser light in the oriented direction and then detects any of the pulses that are reflected back to the LIDAR sensor. The time of flight for the reflected pulses is recorded. The distance to the reflecting object (in most cases, a road surface) can then be determined, such as by the microcontroller 24. The microcontroller 24 may be integrated or interfaced with the LIDAR sensor(s). Although LIDAR sensors are preferred for traffic monitoring, it should be appreciated that other types of sensors or distance measuring methods may be utilized.

C. Vehicle Monitoring Algorithm A car counting algorithm is utilized to process the distance measurements from the distance sensors 21, 22, 28, 29 so as to determine vehicle 12 count and direction of travel. The distance sensors 21, 22, 28, 29 are first calibrated. After calibration, analysis and readings may be performed.

During the calibration phase, the car counter 20 is calibrated for its specific installation. For example, different locations will necessarily have a different distance between the distance sensors 21, 22, 28, 29 and the point of interest such as a road or ground surface. Calibration is utilized to fine-tune each sensor 21, 22, 28, 29 to its specific location and orientation.

Calibration is used to determine what should be considered an "unobstructed" distance reading and what types of readings should be considered to trigger a car count. For example, two values for use in a simple calibration would be (1) the distance to the point of interest when unobstructed and (2) a minimum distance to be considered sufficient to trigger a car count.

Mounting heights, locations, and angles of orientation of the distance sensors 21, 22, 28, 29 may vary depending on the surroundings. Further, not all vehicles have an identical profile and height. In fact, any system should accommodate for a wide range of vehicle 12 types. One method of calibration utilizes manual entry of data for a fixed calibration. In such a fixed calibration, the physical unobstructed distance from each distance sensor 21, 22, 28, 29 to the point of interest (generally a ground surface) may be manually measured and entered into the system.

However, such a fixed calibration may suffer from shortcomings, such as false readings due to different vehicle 12 types. Thus, it is beneficial to utilize a dynamic calibration algorithm that dynamically calculates a distance that is considered the threshold of unobstructed or obstructed readings. Further, as each distance sensor 21, 22, 28, 29 used to monitor a single point of interest may be installed with different geometry, it is important that the calibration (whether fixed or dynamic) be performed for each of the distance sensors 21, 22, 28, 29 of any particular car counter 20.

During normal operation, the measured unobstructed distance from a distance sensor 21 will remain substantially constant with any variations being attributable to small errors in the distance measurement. If the distance measurement is obstructed for one reason or another, this may result in a larger variation over a data set. Using these principles, calibration may be set. Taking data over a set time window (such as 30 seconds, but in some embodiments may be more or less), if the variation of data is measured and considered acceptable, the distance data can be averaged and the result considered to be the unobstructed distance for that distance sensor 21. A threshold distance for an obstruction can then be set as an offset from the calculated unobstructed distance average, with the threshold being set beyond the bounds of the variation in readings to eliminate noise.

Given the dynamic nature of various locations in which the car counter 20 may be set, it is often desirable to use a dynamic calibration. In such an embodiment, the calibration is repeated continuously during operation. For example, each set time window (period) with acceptable variation is used to calculate a new average and offset. There will often be stretches of time (off-peak hours) where there are no obstructions, such as when no vehicles 12 are passing under the car counter 20. The dynamic calibration accounts for such unobstructed periods of time.

With the car counter 20 being calibrated to correlate distance sensor 21 readings, including unobstructed distance measurements and offset thresholds beyond which are to be considered a vehicle, an algorithm may be utilized to detect if a vehicle 12 has passed the point of interest. The systems and methods described herein may use the assignment of numbers to each event, with each event representing that the threshold has been crossed for a given distance sensor 21, 22, 28, 29 of the car counter 20.

The summing of these events in comparison to known pattern sums combined with some state tracking can then be made for the determination of whether an object should be counted. The numbers may be assigned such that the summing of numbers will always be unique. By way of example and without limitation, one such method for ensuring unique numbers is use of Binary (base 2) format for assigned event numbers.

With reference to FIG. 9, an exemplary car counter 20 is shown which is comprised of a first distance sensor 21, a second distance sensor 22, and a microcontroller 24. The distance sensors 21, 22 are illustrated as comprising LIDAR sensors, though other types of sensors may be utilized as discussed previously.

In such an embodiment, the microcontroller 24 will utilize four events to determine if a vehicle has passed. If these events are numbered with an index starting at zero, then using Base 2 format with the index number as the personal notation (bit position) in binary format, the event numbers will be $2^0=1$, $2^1=2$, $2^2=4$, $2^3=8$. The events of significance are thus split up as follows.

Event ID $2^0=1$ represents the first distance sensor 21 going from above threshold to below threshold (first distance sensor 21 down).

Event ID $2^1=2$ represents the first distance sensor 21 going from below threshold to above threshold (first distance sensor 21 up).

Event ID $2^2=4$ represents the second distance sensor 22 going from above threshold to below threshold (second distance sensor 22 up).

Event ID $2^3=8$ represents the second distance sensor 22 going from below threshold to above threshold (second distance sensor 22 up).

The event identification numbers are not, by themselves, sufficient to accurately determine if a vehicle 12 has passed the position of interest and the direction of travel. However, the combination of consecutive events does allow such determinations to be made. Thus, as events are continuously occurring, they are stored in a buffer for further analysis (such as by the microcontroller 24).

Continuing to reference FIG. 9, it can be seen that a vehicle 12 has passed the second distance sensor 22 but not yet reached the first distance sensor 21. At this point in time, the second distance sensor's 22 readings have gone from above threshold to below threshold, resulting in the event carrying a value of 4, which is placed in the event buffer. Moments later when the vehicle 12 moves in the direction indicated to pass under the first distance sensor 21, an event with the value of 1, representing the first distance sensor 21 going from above threshold to below threshold, will be triggered and stored in the buffer.

When two consecutive events sum up to equal 5, it can be considered that the vehicle is over the position of interest. This event value will work regardless of the direction of travel of the vehicle 12. The vehicle 12 direction of travel may also be determined by examining which event occurred first. For reliability, it is prudent that the order of events occurring while the vehicle moves over the position of interest correspond to those of the vehicle leaving the point of interest.

At this point, there are two events in the buffer (4, 1) and the microcontroller 24 knows that they have summed to 5 and thus there is currently a vehicle over the position of interest. The microcontroller 24 can then anticipate that the next readings should correspond to the vehicle 12 leaving. The following two events added to the buffer would ideally then be 8 as the rear of the vehicle 12 moves out from underneath the second distance sensor 22, followed by 2. The buffer thus holds the event values (4, 1, 8, 2) at this point. Two consecutive events summing to equal ten may thus indicate that a vehicle 12 has left the position of interest.

As described above, the use of event numbers assigned to various readings for each distance sensor 21, 22, 28, 29 can be used to determine both (1) whether a vehicle 12 is underneath the car counter 20 and (2) the direction of travel of the vehicle 12. While the above example used only a pair of distance sensors 21, 22, it should be appreciated that additional distance sensors 21, 22 may also be accommodated in such a system to accommodate longer vehicles. Further, the values using Base 2 format is merely for exemplary purposes, and other number values may be utilized in different embodiments.

Figure 11:
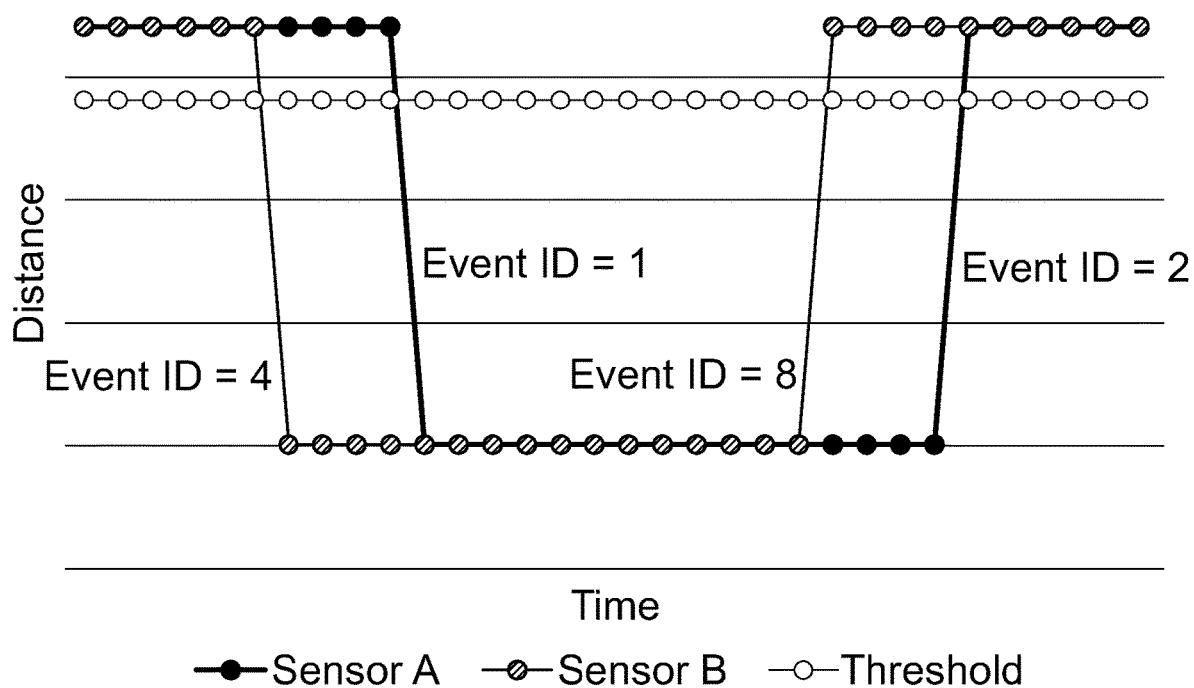
FIG. 11 is a graph illustrating various Event ID's of a vehicle flow monitoring system in accordance with an example embodiment.

To prevent or limit errors, the microcontroller 24 will only consider a vehicle 12 leaving the point of interest if the vehicle 12 has been deemed to have arrived over the point of interest and the order of events for leaving correlates correctly with the vehicle 12 arriving. If so, a vehicle 12 count may be added or subtracted to/from the system as desired based on direction. FIG. 11 illustrates a graph showing the sequence of events just described above for a single vehicle 12 passing under the distance sensors 21, 22.

The car counter 20 is configured to prevent or minimize occurrences of false positives, such as due to a small obstruction passing under the car counter 20. For example, in a parking garage, individuals will frequently pass under the car counter 20 while walking to or from their vehicles 12. It is important that the car counter 20 not register such individuals as vehicles 12 so as to ensure an accurate count.

The algorithm discussed above prevents false positives due to small obstructions such as individuals passing underneath the car counter 20. In such a situation, the first distance sensor 21 would go both up and down before any triggering of the second distance sensor 22. If a person were to walk under the car counter 20, the first distance sensor 21 would read event ID's as a 1 followed by a 2, resulting in a sum of 3 for the first distance sensor 21. The second distance sensor 22 would read event ID's as a 4 followed by an 8, resulting in a sum of 12 for the second distance sensor 21. Therefore, if the microcontroller 24 detects the sum of consecutive events as equalling 3 or 12, the microcontroller 24 will not consider the event to represent a vehicle 12 and it will not be counted.

The described algorithm may also be utilized to prevent false positives due to a pair of close vehicles 12 (e.g., one vehicle 12 tailgating another) or a vehicle 12 towing a trailer. In such a situation, it is possible that the second distance sensor 22 would trigger an event ID of 4 shortly after an event ID of 8, prior to the leading vehicle 12 passing completely from underneath the first distance sensor 21. Such a situation may occur if a second vehicle 12 or a trailer was closer to the first vehicle 12 than the distance separating the distance sensors 21, 22. The second event ID of 4 would then be followed by an event ID of 1 as the tailing vehicle 12 or trailer passes under the first distance sensor 21. Then, as the tailing vehicle moves forward, the second distance sensor 22 would trigger an event ID of 8 and then the first distance sensor 21 would trigger an event ID of 2 to provide a total event ID sequence of (4, 1, 8, 4, 2, 1, 8, 2).

The algorithm may accommodate for such situations by examining the sum of three consecutive event ID's in situations in which a vehicle 12 arrival has been detected previously. For example, such a situation may occur when two consecutive event ID's sum to 5. If a tailgating scenario is occurring, the sum of three consecutive event ID's will be equal to 13 or 7. In the above scenario, it can be seen that three consecutive event ID's sum to 7 (4, 2, 1) indicating a tailgating scenario.

The system may treat such tailgating scenarios differently depending on the situation. One possible treatment of such scenarios is for the system to count the capture of the tailgating scenario as an additional vehicle 12. This approach may be desirable when counting vehicles 12 entering a parking garage 14 since a vehicle 12 towing a trailer or a tailgating vehicle 12 will occupy two parking spaces 15. In another scenario, such as on a high-speed freeway, it would more likely that the vehicle 12 has a trailer rather than a tailgater due to the relative speed of vehicles 12 travelling. In such a situation, an additional count may not be added.

In either case, the event buffer is cleared up to the point of the original arrival after the appropriate event sequence has been detected and flagged. In an embodiment utilizing a pair of distance sensors 21, 22, the event buffer will always be removed of four events. After the algorithm has removed any such tailgating events, the system will reset to the same state as if a single vehicle 12 is passing. In other words, the system will be in a state that a vehicle 12 has arrived and awaiting departure with the corresponding exit pattern having event ID's summed to ten, representing event ID's of (8, 2) which represents the vehicle 12 passing. A single vehicle 12 will be counted.

The algorithm may also accommodate for variance and errors in readings. For example, a vehicle 12 moving at speed with an irregular shape may result in two consecutive matching sets of events occurring. For example, the event buffer would be (1, 2, 1, 2) or (8, 4, 8, 4). In such circumstances, the system will be configured to ignore duplicate sets of events. For example, if the system reads (1, 2, 1, 2), the system will ignore the duplicate set and instead output only (1, 2). Similarly, if the system reads (8, 4, 8, 4), the system will ignore the duplicate set and instead output only (8, 4). In this manner, such false positives can be accommodated for in real-time without affecting future events.

Figure 13:
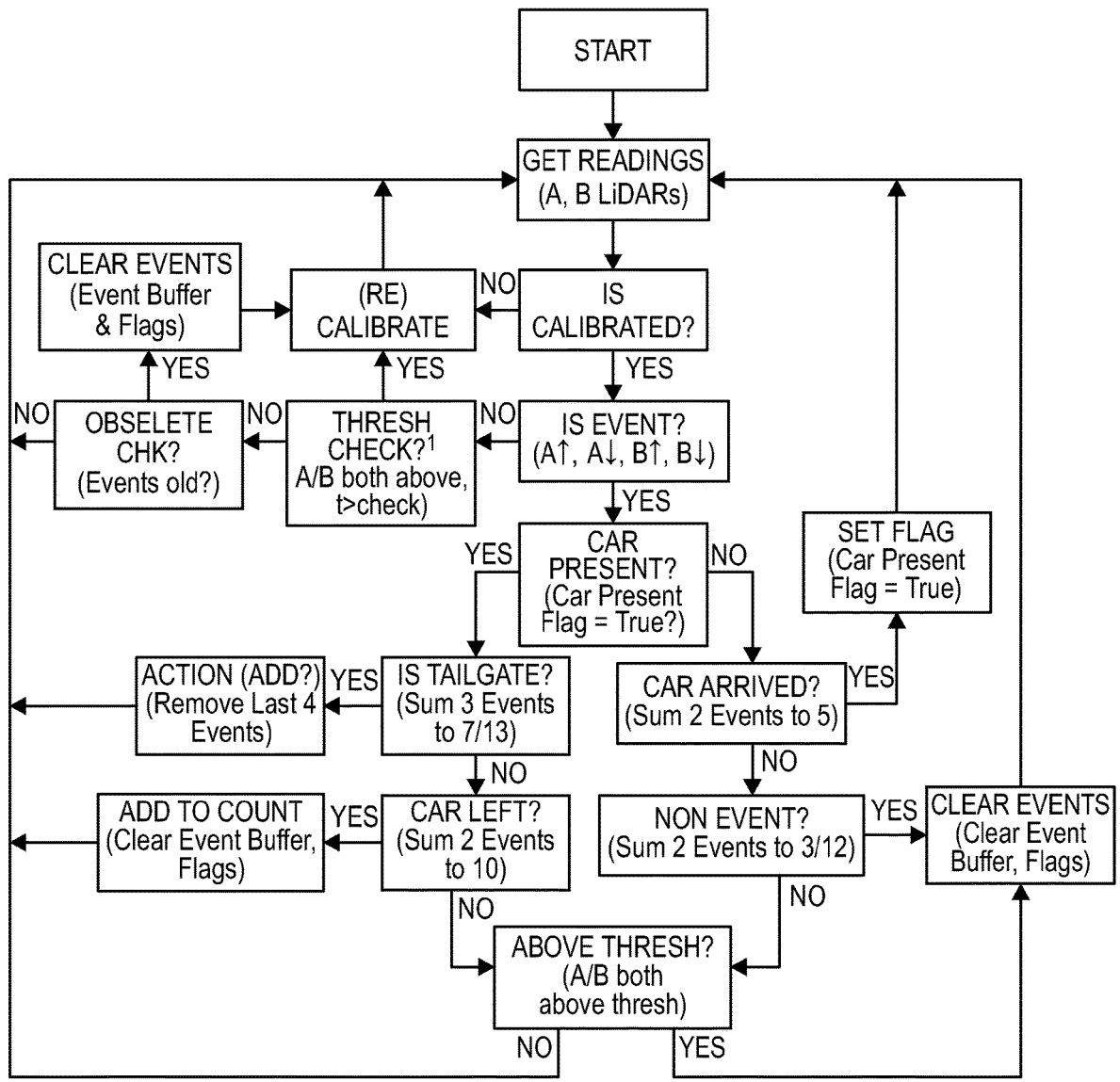
FIG. 13 is a flowchart illustrating operation of a vehicle flow monitoring system in accordance with an example embodiment.

The system will generally reset or resolve an event buffer when both distance sensors 21, 22 return readings above their detection threshold as there is no vehicle or obstruction under either of the sensors 21, 22. Any flags remaining in the buffer can also be cleared. Further, the system may be configured to remove events after a certain period of time has passed. FIG. 13 illustrates an exemplary flowchart showing operation of the algorithm with a car counter 20 including two distance sensors 21, 22.

D. Vehicle Flow Monitoring System

The systems and methods described above may be incorporated into a larger vehicle flow monitoring system 10 configured to provide traffic and/or parking statistics and/or guidance based on the data received from the car counter(s) 20 and other devices described below.

Figure 12:
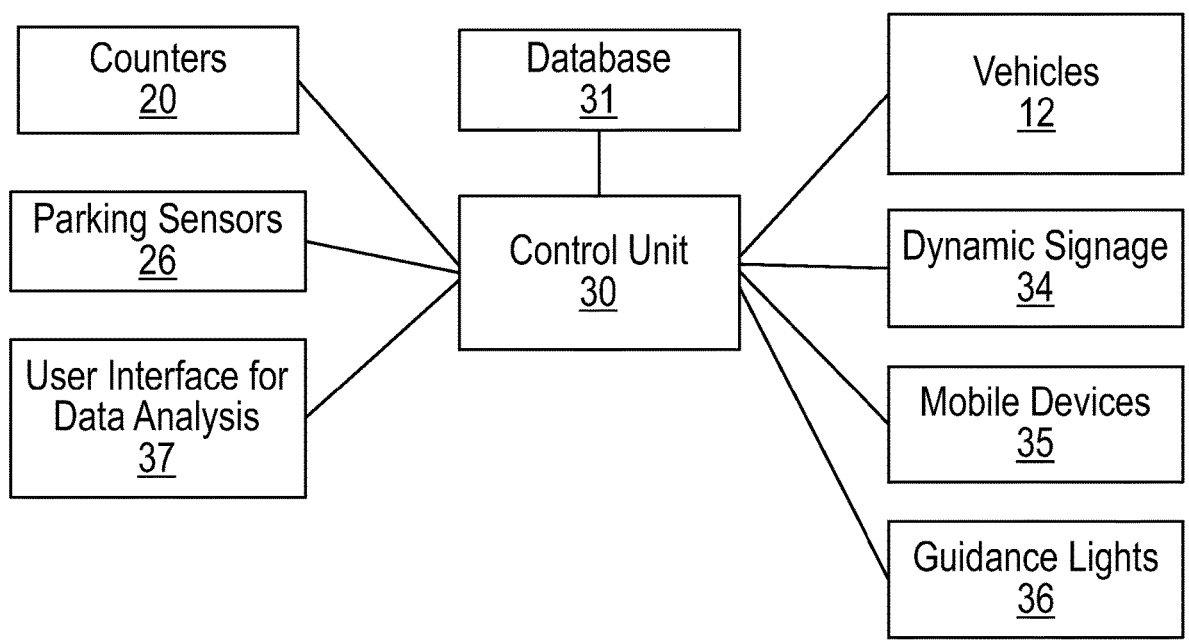
FIG. 12 is a block diagram of a vehicle flow monitoring system in accordance with an example embodiment.

FIG. 12 illustrates an exemplary vehicle flow monitoring system 10 which incorporates a central control unit 30, a database 31, car counters 20, parking sensors 26, a user interface 37, vehicles 12, dynamic signage 34, mobile devices 35, and guidance lights 36. As shown in FIG. 12, the car counters 20 communicate to a cloud-based central control unit 30 either directly or through a communications network such as a gateway.

The central control unit 30 may be a single computer system or may be multiple computer systems through distributed computing. The central control unit 30 may be comprised of a server computer or a standalone processing box. The central control unit 30 may include a database 31 or may be communicatively interconnected with a database 31. The central control unit 30 may be interconnected with the car counters 20 and other devices via a wired connection or a wireless connection, such as Wi-Fi, RF, Bluetooth, or the like.

The central control unit 30 may either include or be communicatively interconnected with a database 31. In either case, the associated database 31 may contain all relevant data for the vehicle flow monitoring system 10. By way of example and without limitation, the database 31 may include data such as device locations, device counts, parking structure details, users, login information, historical car transitions, details of associated dynamic signage, operational parameters and the like along with the association of all data elements. The database 31 may be stored across multiple systems or may be stored on a single system.

The central control unit 30 may display a user interface 37 which may be used by operators of the vehicle flow monitoring system 10 to ensure that all elements of the system 10 are properly functioning. For example, the user interface 37 may indicate if one or more sensors 21, 22, 26, 28, 29 have failed. As another example, the user interface 37 may provide data related to calibration. As yet another example, the user interface 37 may display the readings of the car counters 20 and/or parking sensors 26. The user interface 37 may be visible directly on the central control unit 30, or may be visible remotely such as through the use of a mobile device 35.

Figure 10:
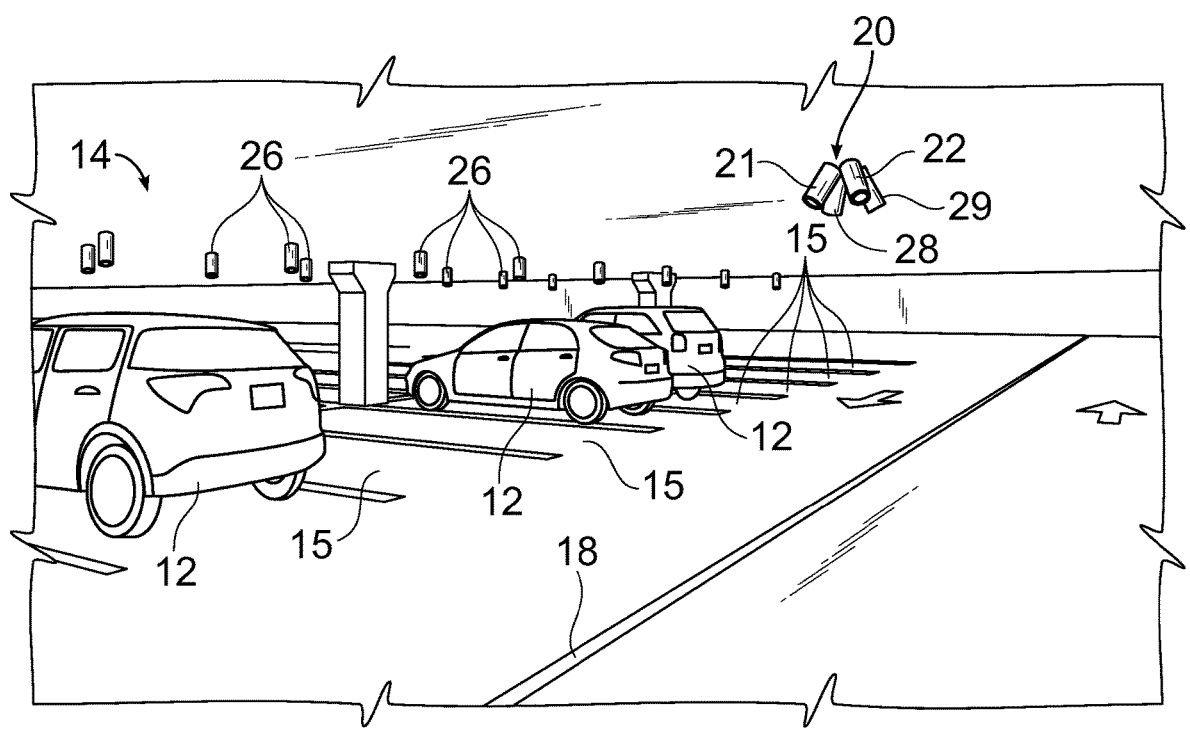
FIG. 10 is a perspective view of a vehicle flow monitoring system in accordance with an example embodiment.

Continuing to reference FIG. 12, it can be seen that parking sensors 26 may be communicatively interconnected with the central control unit 30. As shown in FIG. 10, an exemplary parking garage 14 includes a plurality of parking spaces 15 defined by lines on the underlying road surface. In an exemplary embodiment, each of the parking spaces 15 may include its own parking sensor 26. In other embodiments, only some of the parking spaces 15 may include a parking sensor 26.

Each of the parking spaces 15 is communicatively interconnected with the control unit 30. The parking sensors 26 may be comprised of various types of sensors known in the art to indicate whether an object such as a vehicle 12 is parked in the parking space 15. In an exemplary embodiment, each parking sensor 26 is adapted to indicate to the central control unit 30 whether the associated parking space 15 is occupied or unoccupied.

As shown in FIG. 12, the vehicle flow monitoring system 10 may also include dynamic signage 34. The signage 34 may provide relevant information processed by the control unit 30. For example, in a parking garage 14, the signage 34 may indicate the number of available parking spaces 15 which is detected by use of the parking sensors 26. In a parking garage 14 without parking sensors 26, the car counter 20 may instead by utilized to provide the number of available parking spaces 15 to be displayed on the signage 34.

Continuing to reference FIG. 12, it can be seen that mobile devices 35 may be communicatively interconnected with the control unit 30. The mobile devices 35 may comprise smart phones, smart watches, laptops, and the like. The mobile devices 35 may provide various functionality, such as but not limited to displaying a user interface 37 which may be used for displaying data from the vehicle flow monitoring system 10. For example, the user interface 37 on the mobile device 35 may display the number of parking spaces 15 which are available in a parking garage 14. As another example, the user interface 37 on the mobile device 35 may display traffic patterns on a desired roadway.

The vehicle flow monitoring system 10 may also include guidance lights 36 which will guide vehicles 12 based on information from the car counters 20 and/or parking sensors 26. For example, the guidance lights 36 may illuminate to guide a vehicle 12 toward parking spaces 15 that are known to be available due to the parking sensors 26. It should be appreciated that the guidance lights 36 may provide a wide range of functionality.

E. Operation of Preferred Embodiment

Figure 14:
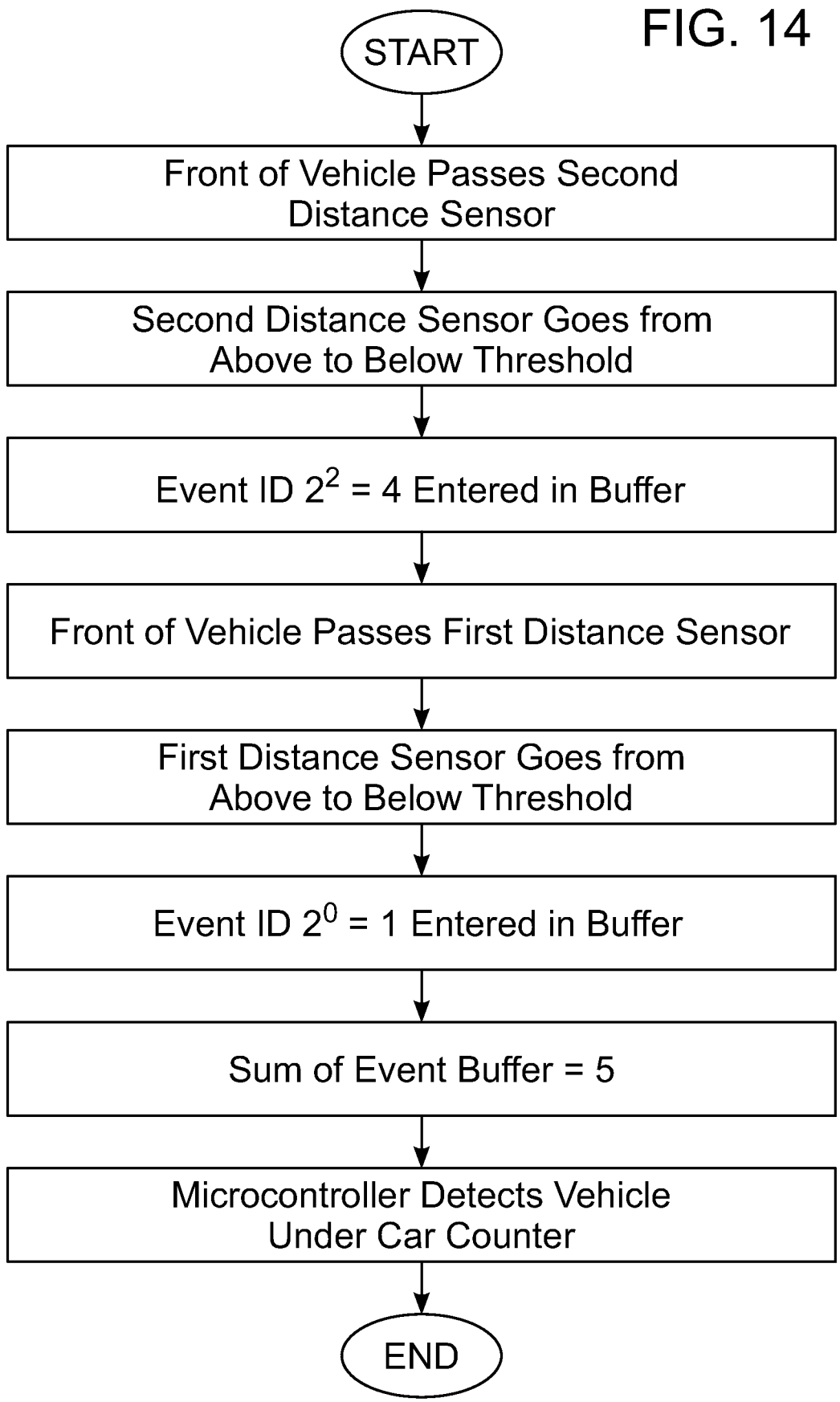
FIG. 14 is a flowchart illustrating detection of a vehicle underneath a car counter of a vehicle flow monitoring system in accordance with an example embodiment.
Figure 15:
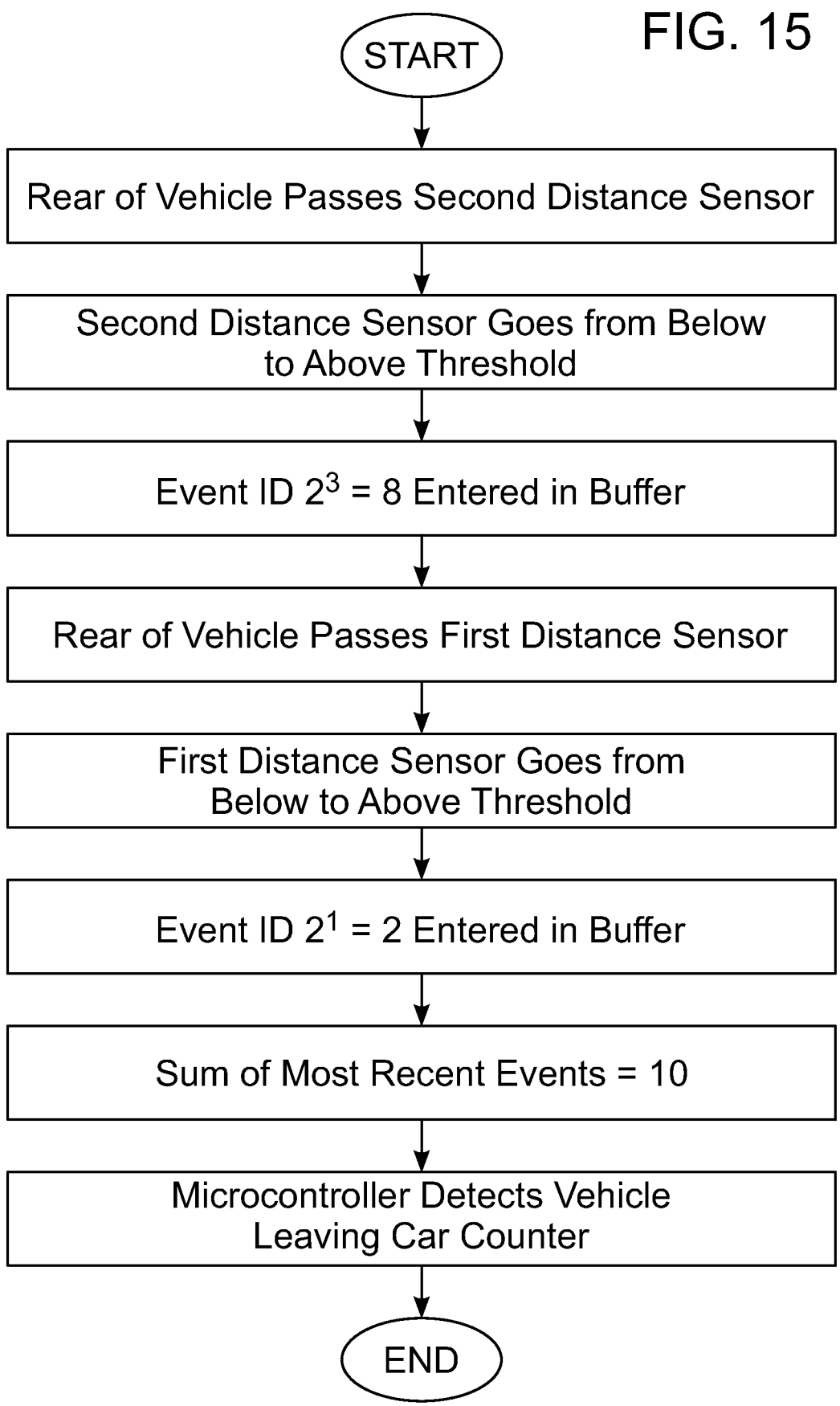
FIG. 15 is a flowchart illustrating passage of a vehicle past a car counter of a vehicle flow monitoring system in accordance with an example embodiment.

FIGS. 14 and 15 illustrate an exemplary method of counting a vehicle 12 passing a point of interest. In the exemplary situation shown in FIGS. 14 and 15, a vehicle 12 passes the second distance sensor 22 of the car counter 20 first. As the front of the vehicle 12 passes the second distance sensor 22, the second distance sensor's 22 distance reading will go from above to below the threshold. An Event ID of 4 will thus be entered into the buffer. As the front of the vehicle 12 passes the first distance sensor 21, the first sensor's 21 distance reading will go from above to below threshold. An Event ID of 1 will be entered in the buffer.

At this point, the sum of the two most recent events is equal to 5, so the control unit 30 will recognize that a vehicle 12 is underneath the car counter 20. The control unit 30 will also know the direction of travel of the vehicle 12 based on the second distance sensor 22 being "triggered" first.

As shown in FIG. 15, as the rear of the vehicle 12 passes the second distance sensor 22, the second distance sensor's 22 distance reading will go from below to above the threshold. An Event ID of 8 will be entered into the buffer. As the rear of the vehicle 12 passes the first distance sensor 21, the first distance sensor's 21 distance reading will go from below to above threshold. An Event ID of 2 will be entered in the buffer.

At this point, the sum of the two most recent events is equal to 10, so the control unit 30 will recognize that the vehicle 12 has left the car counter 20. The control unit 30 will then update the database 31 to reflect the additional vehicle 12 having been counted by updating the car count.

Figure 16:
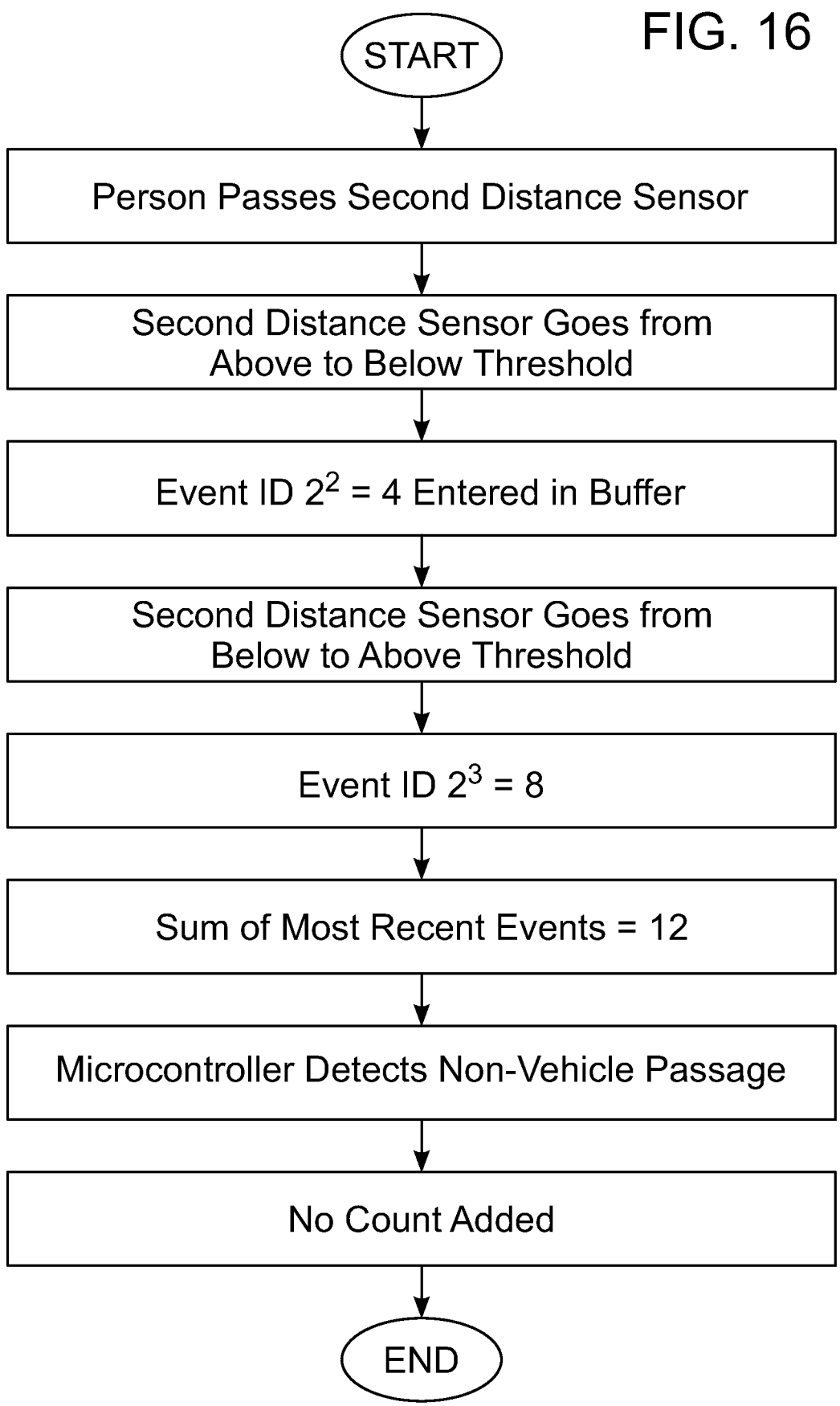
FIG. 16 is a flowchart illustrating passage of a person past a second distance sensor of a vehicle flow monitoring system in accordance with an example embodiment.
Figure 17:
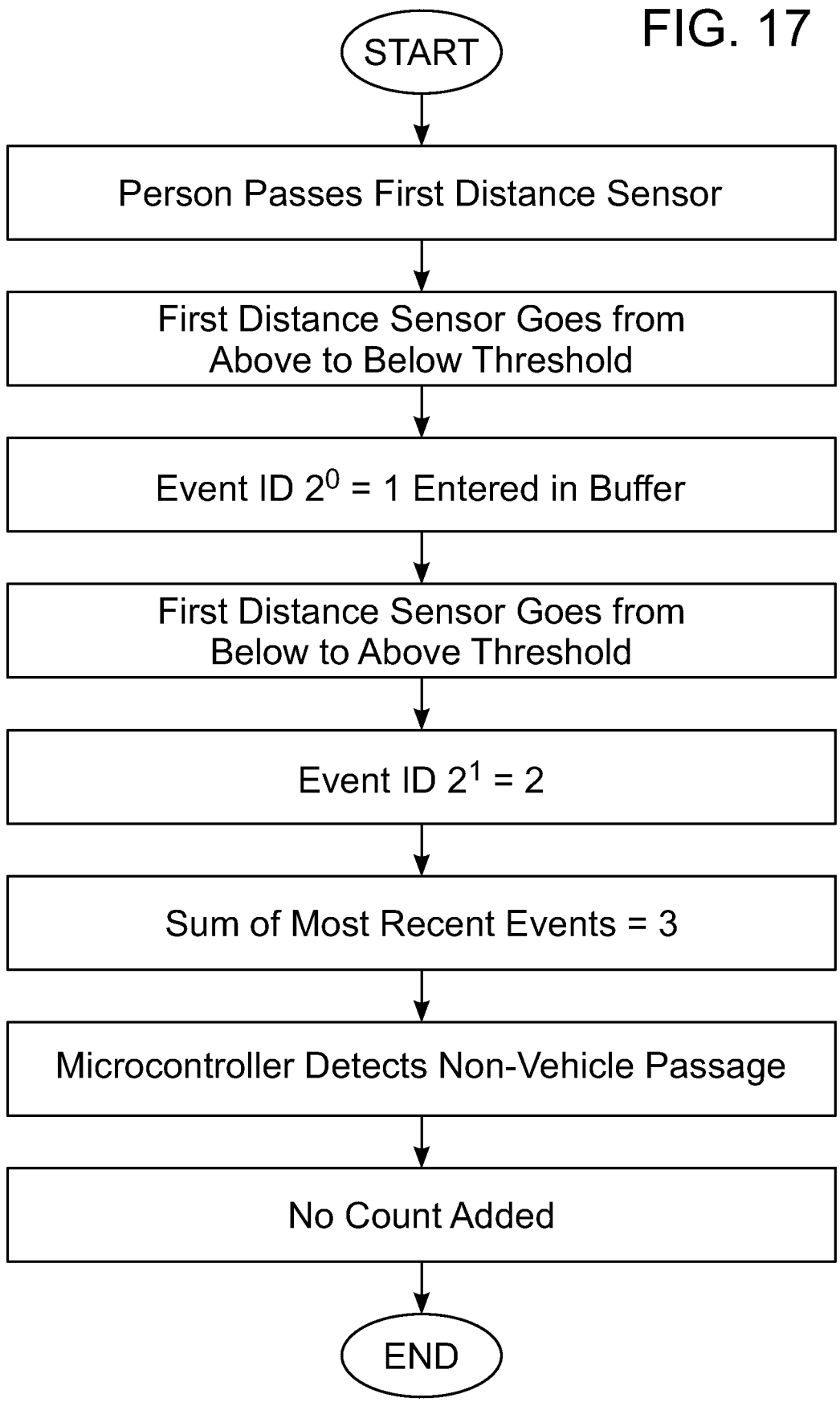
FIG. 17 is a flowchart illustrating passage of a person past a first distance sensor of a vehicle flow monitoring system in accordance with an example embodiment.

FIGS. 16 and 17 illustrate an exemplary method of recognizing that a human, rather than a vehicle 12, has passed the car counter 20. As the person passes the second distance sensor 22, the second distance sensor 22 will go from above to below threshold and a 4 will be entered in the buffer. Because the first distance sensor 21 will generally be distally-spaced with respect to the second distance sensor 22, the second distance sensor 22 will also detect the person leaving from underneath the second distance sensor 22, resulting in the second distance sensor 22 going from below to above threshold prior to the person reaching the first distance sensor 21. An Event ID of 8 will be entered in the buffer.

As the sum of the most recent events is 12, the control unit 30 will recognize that it was not a vehicle 12 that passed under the car counter 20. No car count will be added to the database 31. FIG. 17 illustrates the same method being used in connection with the first distance sensor 21, which results in Event ID's of (1, 2) which sum to 3 and are similarly recognized by the control unit 30 as a non-vehicle passage.

Figure 18:
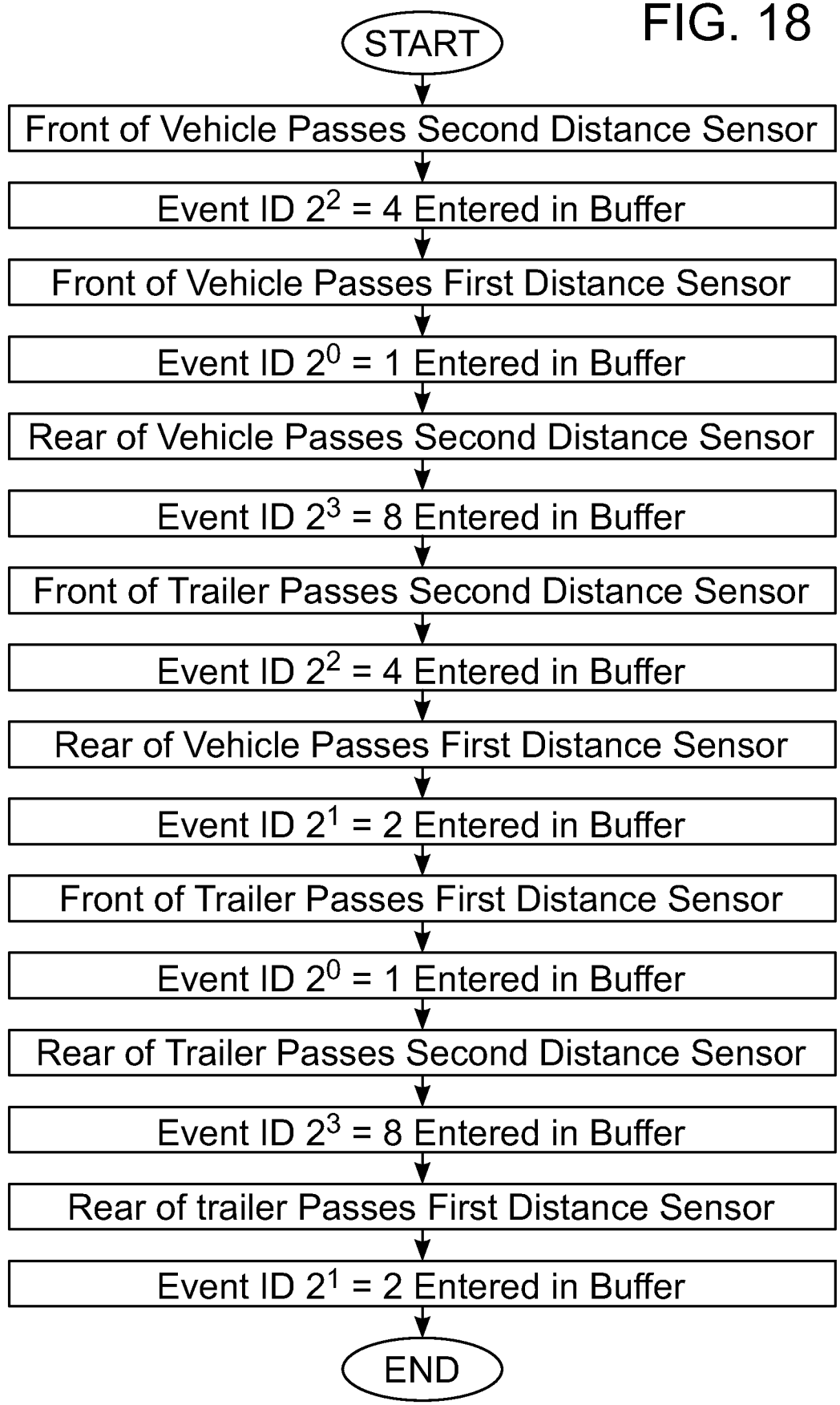
FIG. 18 is a flowchart illustrating passage of a vehicle and trailer past a car counter of a vehicle flow monitoring system in accordance with an example embodiment.
Figure 19:
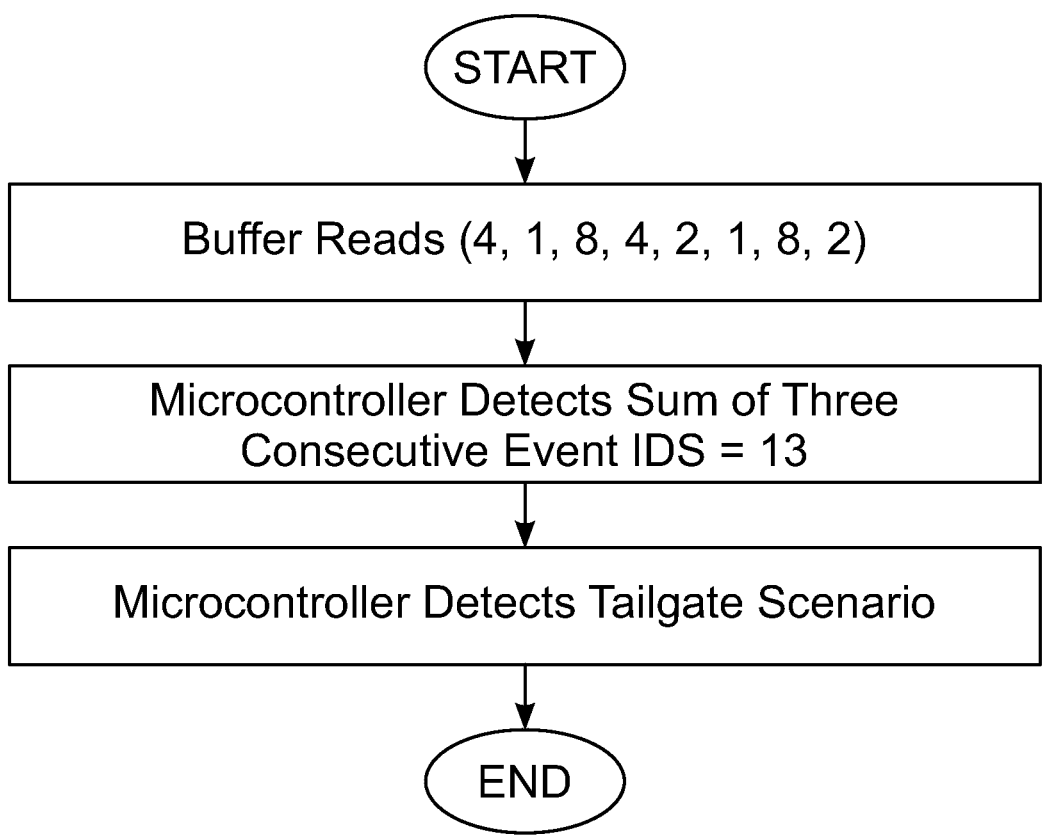
FIG. 19 is a flowchart illustrating detection of a tailgate or trailer scenario of a vehicle flow monitoring system in accordance with an example embodiment.

FIGS. 18 and 19 illustrate an exemplary method of recognizing a tailgating situation in which either two vehicles 12 are driving dangerously close to each other or a single vehicle 12 has a trailer or other towed apparatus. As the front of the vehicle 12 passes the second distance sensor 22, an Event ID of 4 is entered into the buffer. As the front of the vehicle 12 passes the first distance sensor 21, an Event ID of 1 is entered in the buffer. As the rear of the vehicle 12 passes the second distance sensor 22, an Event ID of 8 is entered in the buffer.

If the vehicle 12 is towing a trailer, the front of the trailer will then pass the second distance sensor 22, resulting in an Event ID of 4 being entered into the buffer. The rear of the vehicle 12 will next pass the first distance sensor 21, resulting in an Event ID of 2 entered in the buffer. The front of the trailer will then pass the first distance sensor 21, resulting in an Event ID of 1 entered in the buffer. The rear of the trailer will then pass the second distance sensor 22, resulting in an Event ID of 8 entered in the buffer. Finally, the rear of the trailer will pass the first distance sensor 21, resulting in an Event ID of 2 being entered in the buffer.

After both the vehicle 12 and trailer have passed the car counter 20, the Event buffer will read (4, 1, 8, 4, 2, 1, 8, 2) as outlined above. The control unit 30 will recognize that the sum of three consecutive events (1, 8, 4) is equal to 13, which is representative of a tailgating scenario. The control unit 30 may choose to add only a single car count in such a circumstance or, in some embodiments, may still add a double car count to accommodate for the extra parking space 15 taken by the trailer.

It should be appreciated that the vehicle flow monitoring system 10 may be utilized in a wide range of settings to provide a wide range of functionality. The control unit 30 will generally collate data from various sensors such as car counters 20 and/or parking sensors 26 to be stored in the database 31 for appropriate system applications.

For example, car counters 20 may be arranged on a roadway such as a freeway to monitor traffic patterns and loads during different times. This data may be continuously stored in the database 31 to be retrieved when needed. As an example, using this information, traffic engineers can make plans to improve such roadways based on data received and processed by the vehicle flow monitoring system 10.

As another example, if a parking garage 14 or parking lot with forty spaces has a single entry and exit point, a car counter 20 may be positioned at both the entry and the exit along with dynamic signage 34 displaying parking availability. As a vehicle 12 enters the parking garage 14, the car counter 20 will recognize the vehicle's 12 entry and communicate an updated car count to the control unit 30. The control unit 30 then updates the database 31 and revises the available number of parking spaces 15, which is displayed on the dynamic signage 34.

Similarly, when a vehicle 12 exits the parking garage 14, the car counter 20 will recognize the vehicle's 12 exit and communicate an updated car count to the control unit 30. The control unit 30 then updates the database 31 to reflect the exited vehicle 12 and revises the available number of parking spaces 15, which is updated on the dynamic signage 34.

Because the system recognizes vehicle 12 direction of movement, a vehicle 12 entering the parking garage 14 through the exit lane will still be counted as an added car count rather than a subtraction, since the system 10 will recognize that the vehicle 12 entered, rather than exited, the parking garage 14 based on the detected direction of movement of the vehicle 12.

In some embodiments, a parking garage 14 or lot may form part of a series of parking areas which are associated with the same complex, such as a hospital or shopping mall. Each of the parking areas may include their own car counters 20 and/or parking sensors 26 so that the dynamic signage 34 and database 31 may be updated with car counts for both the entire complex and for individual parking areas such as parking garages 14. The system 10 is fully configurable using the control unit 30. For example, the system 10 may be configured to use guidance lights 36 to direct motorists to the parking area in the complex with the most available parking spaces 15.

As yet another non-limiting example, a car counter 20 may be placed at all entry and exit points for an area of interest such as a central business district of a city. The control unit 30 may then determine the total number of vehicles within the central business district and communicate that information to dynamic signage 34 or store the relevant information for viewing and analysis via a user interface 37.

Unless otherwise defined, all technical and scientific terms used herein have the same meaning as commonly understood by one of ordinary skill in the art to which this invention belongs. Although methods and materials similar to or equivalent to those described herein can be used in the practice or testing of the vehicle flow monitoring system, suitable methods and materials are described above. All publications, patent applications, patents, and other references mentioned herein are incorporated by reference in their entirety to the extent allowed by applicable law and regulations. The vehicle flow monitoring system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A method for counting vehicles comprising:
   obtaining, with a first distance sensor directed towards a position of interest, a first measurement of distance between the first distance sensor and the position of interest and transmitting a first signal representative of the first measurement;
   obtaining, with a second distance sensor directed towards the position of interest, a second measurement of distance between the second distance sensor and the position of interest, and transmitting a second signal representative of the second measurement;
   responsive to receiving the first signal, comparing the first measurement to a first distance threshold value and, responsive to receiving the second signal, comparing the second measurement to a second distance threshold value;
   determining that a vehicle has obstructed the position of interest when both the first measurement is less than the first distance threshold value and the second measurement is less than the second distance threshold value; and determining that a vehicle has not obstructed the position of interest when either the first measurement is greater than the first distance threshold value or the second measurement is greater than the second distance threshold value.

2. The method of claim 1, wherein each of the first distance sensor and the second distance sensor comprise a LIDAR sensor.

3. The method of claim 1, further comprising calibrating the first distance sensor and calibrating the second distance sensor.

4. The method of claim 3, wherein calibrating the first distance sensor and the second distance sensor comprises fixedly calibrating the first distance sensor and fixedly calibrating the second distance sensor.

5. The method of claim 4,
wherein fixedly calibrating the first distance sensor includes:
defining a first unobstructed distance between the position of interest and the first distance sensor based on a plurality of first measurements occurring in a predetermined time window; and
defining the first distance threshold value, wherein a first measurement outside the first distance threshold value indicates a first obstruction between the first distance sensor and the position of interest; and
wherein fixedly calibrating the second distance sensor includes:
defining a second unobstructed distance between the position of interest and the second distance sensor based on a plurality of second measurements occurring in a predetermined time window; and
defining the second distance threshold value, wherein a second measurement outside the second distance threshold value indicates a vehicle obstruction between the second distance sensor and the position of interest.

6. The method of claim 5, wherein calibrating one or both of the first distance sensor and the second distance sensor comprises dynamically calibrating one or both of the first distance sensor and the second distance sensor by repeatedly, fixedly calibrating the first distance sensor and repeatedly, fixedly calibrating the first distance sensor.

7. The method of claim 5, wherein the first distance threshold value is beyond a noise level of the first unobstructed distance.

8. The method of claim 7, wherein the second distance threshold value is beyond a noise level of the second unobstructed distance.

9. The method of claim 1, further comprising determining a direction of the vehicle based on a sequence of the first measurement and the second measurement.

10. The method of claim 1, wherein the first measurement of distance and the second measurement of distance are obtained substantially simultaneously.

11. The method of claim 1, further comprising classifying, based on first and second measurements, transitions between an unobstructed position of interest and an obstructed position of interest as events.

12. The method of claim 11, further comprising assigning each event with an Event ID.

13. The method of claim 1, further comprising orienting the first distance sensor and the second distance sensor vertically relative to the position of interest.

14. The method of claim 1, further comprising orienting the first distance sensor and the second distance sensor angularly relative to the position of interest.

15. The method of claim 1, further comprising determining that the vehicle has a trailer based on the first measurement of distance and the second measurement of distance.

16. The method of claim 1, further comprising determining that a non-vehicle has obstructed the position of interest based on the first measurement of distance and the second measurement of distance.

17. A method for counting vehicles comprising:
obtaining, with a first distance sensor directed towards a position of interest, a first measurement of distance between the first distance sensor and the position of interest and transmitting a first signal representative of the first measurement;
obtaining, with a second distance sensor directed towards the position of interest, a second measurement of distance between the second distance sensor and the position of interest, and transmitting a second signal representative of the second measurement;
responsive to receiving the first signal, comparing the first measurement to a first distance threshold value and, responsive to receiving the second signal, comparing the second measurement to a second distance threshold value;
determining that a vehicle has obstructed the position of interest when both the first measurement is less than the first distance threshold value and the second measurement is less than the second distance threshold value;
determining that a vehicle has not obstructed the position of interest when either the first measurement is greater than the first distance threshold value or the second measurement is greater than the second distance threshold value; and
based on determining that the vehicle has obstructed the position of interest, adding the vehicle to a vehicle count.

18. The method of claim 17, further comprising displaying the vehicle count.

19. The method of claim 17, wherein each of the first distance sensor and the second distance sensor comprise a LIDAR sensor.

20. The method of claim 17, further comprising calibrating the first distance sensor and calibrating the second distance sensor to determine an unobstructed distance between the first distance sensor the position of interest and to determine an unobstructed distance between the second distance sensor and the position of interest, respectively.

* * * * *